(12) United States Patent
Garrec

(10) Patent No.: US 8,460,222 B2
(45) Date of Patent: Jun. 11, 2013

(54) FOREARM ROTATION MECHANISM AND ORTHESIS WHICH INCLUDES SUCH A MECHANISM

(75) Inventor: Philippe Garrec, Gif sur Yvette (FR)

(73) Assignee: Commissariat a l'Energie Atomique, Paris (FR)

( * ) Notice: Subject to any disclaimer, the term of this patent is extended or adjusted under 35 U.S.C. 154(b) by 690 days.

(21) Appl. No.: 12/663,568

(22) PCT Filed: Jun. 12, 2008

(86) PCT No.: PCT/EP2008/057388
§ 371 (c)(1),
(2), (4) Date: Dec. 8, 2009

(87) PCT Pub. No.: WO2008/155286
PCT Pub. Date: Dec. 24, 2008

(65) Prior Publication Data
US 2010/0204804 A1    Aug. 12, 2010

(30) Foreign Application Priority Data

Jun. 12, 2007 (FR) ...................... 07 55701

(51) Int. Cl.
*A61H 1/00* (2006.01)
*A61H 1/02* (2006.01)
*A61H 5/00* (2006.01)

(52) U.S. Cl.
USPC .......... 601/5; 601/23; 601/33; 601/40; 602/5; 602/20; 602/21; 482/44; 482/45; 482/46

(58) Field of Classification Search
USPC .............. 601/5, 15–21, 23, 33, 40; 482/44–4, 482/79, 806; 602/5
See application file for complete search history.

(56) References Cited

U.S. PATENT DOCUMENTS

| 4,784,120 A | 11/1988 | Thomas |
| 4,883,400 A | 11/1989 | Kuban et al. |

(Continued)

FOREIGN PATENT DOCUMENTS

| EP | 1 138 286 A2 | 10/2001 |
| EP | 1 364 755 A1 | 11/2003 |

(Continued)

OTHER PUBLICATIONS

Garrec et al; "Une nouvelle technologie d'orthese portable",Handicap 2004, p. 170-175 Jun. 17-18, 2004.

(Continued)

*Primary Examiner* — Justine Yu
*Assistant Examiner* — Michael Tsai
(74) *Attorney, Agent, or Firm* — Pearne & Gordon LLP

(57) ABSTRACT

Rotation mechanism for a forearm which includes a moving stay (2) which supports a wrist, which includes at least one guide track in the form of an arc of a circle, a fixed stay (4) which supports the rear end of a forearm, rods (12) that are rigid lengthwise which link the moving stay (2) and the fixed stay (4) and which allow the moving stay (2) and fixed stay (4) to rotate around a longitudinal axis (Z), by means of articulated links which can rotate (14), and a strut (6) rigidly linked at one of its ends to the fixed stay (4), and linked at its other end to a roller-bearing, whose rollers are in rolling contact with the guide track of the moving stay (2), and which cause the moving stay (2) to pivot around a longitudinal axis (Z), where the direction of said longitudinal axis (Z) passes through the centre of the arc of the circle of the guide track and through the centre of a circle defined by the ends of rods linked to the fixed stay.

28 Claims, 17 Drawing Sheets

U.S. PATENT DOCUMENTS

| | | | | |
|---|---|---|---|---|
| 5,738,636 | A | * | 4/1998 | Saringer et al. ............... 601/5 |
| 5,848,979 | A | * | 12/1998 | Bonutti et al. ............... 601/5 |
| 5,865,714 | A | | 2/1999 | Marlowe |
| 5,951,499 | A | * | 9/1999 | Saringer et al. ............. 601/33 |
| 6,740,051 | B2 | * | 5/2004 | Hepburn et al. ............... 601/5 |
| 6,743,187 | B2 | * | 6/2004 | Solomon et al. ........... 600/587 |
| 7,204,814 | B2 | * | 4/2007 | Peles ............................ 601/5 |
| 7,537,547 | B1 | * | 5/2009 | Hosick et al. ................ 482/45 |
| 2003/0074990 | A1 | | 4/2003 | Garrec |
| 2003/0105416 | A1 | | 6/2003 | Hepburn et al. |
| 2006/0150753 | A1 | | 7/2006 | Massimo et al. |

FOREIGN PATENT DOCUMENTS

| | | |
|---|---|---|
| FR | 2 809 464 A1 | 11/2001 |
| WO | 95/32842 A2 | 12/1995 |
| WO | 2004/058457 A1 | 7/2004 |
| WO | 2004/058458 A1 | 7/2004 |
| WO | 2006/058442 A1 | 6/2006 |

OTHER PUBLICATIONS

French Preliminary Search Report dated Nov. 16, 2007.
International Search Report for PCT/EP2008/057388.

* cited by examiner

FOREARM ROTATION MECHANISM AND ORTHESIS WHICH INCLUDES SUCH A MECHANISM

TECHNICAL FIELD AND PRIOR ART

The present invention relates to forearm rotation mechanisms and to ortheses or exoskeletons which include such mechanisms.

Ortheses are components which are similar to motor-driven manipulators and which are arranged on the exterior of human limbs and parallel to them. They are used to assist individuals by, for example, supporting the weight of their limb and by providing additional force if necessary. They may also be used as a movement sensor for the limb whilst eliminating fatigue required in balancing it during various tasks: remote handling, clinical studies etc.

Several difficulties are encountered, however, in the realisation of these devices.

On the one hand, although it is easy to reproduce transverse rotations by making a mechanical axis of rotation coincide with the axis or pseudo-axis of the anatomical rotation, it is however much less easy to realise longitudinal axes (in the case, for example, of arms or forearms). The most widely used solution involves the use of an annular guide, for example a ball bearing, inside which the operator's arm is introduced. This solution prevents easy fitting and rapid release, something which is even more marked for an individual who is handicapped. In addition the psychological impression of being imprisoned slows down the development of such ortheses. Furthermore this solution might not be viable for safety reasons.

In order to overcome the impression of being imprisoned, an open circular guide has been developed whose notional axis of rotation is made to coincide with the anatomical axes or pseudo-axes of the limb. This involves, in effect, a fixed arc of a circle acting as a rail, on which a roller-mounted carriage moves.

Document US2006/0150753 describes an orthesis for an arm from the shoulder to the forearm and which combines a semi-circular guide for the arm with a closed circular guide for the fore-arm.

Each guide is firmly fixed to a beam, which demarcates two segments which are articulated in relation to each other.

The beams are large in order to support the mass of the moving parts and to withstand bending forces. In addition, the means of actuation are not offset, which makes these segments even heavier. This orthesis is therefore cumbersome, with a significant mass and significant inertia. Furthermore the confinement of the forearm can rule out this solution.

Document WO2004/058457 describes an orthesis for a forearm formed by an open semi-circular guide supported by a beam. Although this orthesis does not have the drawback of being confining, the beam supporting the guide is, however, of significant mass in order to support the weight of the guide and withstand bending forces. In addition, in order to precisely define the direction of the axis of rotation defined by the circular guide and which reproduces the axis of the limb that is being assisted, it is necessary to resort using a guide and carriage with significant mass. In effect, this axis is only defined by the circular guide. This orthesis is therefore cumbersome and heavy and exhibits significant inertia.

In previous mechanisms, the lever arm produces a significant bending moment, which causes very high levels of local stress on the guide rail and hence friction which hinders movements. Such systems therefore have relatively low load limits. One of the aims of the invention is to propose a mechanism which spreads and separates the bending moments and the shear force.

In addition it is also desirable to be able to integrate the actuators for the two transverse axes of the wrist on-board the mechanism. With designs using the current state of the technique, however, their mass is made to rotate, which involves significant inertia.

Consequently it is an objective of the present invention to provide an orthesis with small overall dimensions, of low mass, which exhibits low inertia and which is quick and simple to fit.

PRESENTATION OF THE INVENTION

The above stated objective is achieved by a forearm rotation mechanism in the form of a cradle, whose front is demarcated by a moving stay on a strut and at the rear by a stay fixed to the strut, where the moving and fixed stays are connected by rigid rods. The moving stay has an approximately curved shape designed to pivot around an axis which is designed to be near to the longitudinal axis of the forearm, and means of actuation of the front stay mounted on the strut.

In other words the mechanism according to the invention defines a longitudinal axis of rotation between a moving part and a fixed part, connected together by rods which are rigid lengthwise and which are articulated at their ends, which withstand the bulk of the bending moments, where the moving part includes a guide track in the form of an arc of a circle, and where the fixed part and the moving part are also linked in parallel by a strut which is rigidly fixed to the fixed part, in order to withstand the bulk of the shear force, and connected to a roller bearing whose rollers are in rolling contact with the moving part's guide track in the form of an arc of a circle. Thus a precise axis of rotation is obtained whilst using a light, open circular guide which has small overall dimensions. In effect it is no longer necessary to use a circular guide which is designed to withstand all forces by itself, in particular those due to bending. The mechanism according to the invention uses the principle of articulated rods, which optimise the transmission of the rotation movement, and reduce the negative effect of bending forces by converting them into traction/compression forces in the bars. Thus friction under load is also reduced.

The mechanism according to the invention may include:
two components, one fixed and the other able to move, connected by rods which are rigid lengthwise and which are articulated at each of their ends using ball-joint or equivalent means of connection in order to balance the bulk of the bending movement,
where the curved moving part is suitable for holding the operator's wrist and where it includes a guide track in the form of an arc of a circle,
a strut, which takes up the bulk of the shear force, one end of which is rigidly fixed to the fixed part and the other end of which is linked to the moving part by a roller-bearing, made up of a set of three rollers at least in rolling contact with the guide track forming the arc of a circle on the moving part, which imposes on the moving part a rotation movement around the notional centre of the guiding arc of a circle.

The strut is preferably made using a mesh of light bars, whose rigidity is such that the run-out of the moving part does not result in unwanted angular movements which are perceptible to the user.

In one specific example, the mechanism according to the invention includes in addition:

a parallel gear drive transmission formed of a toothed segment connected to the moving part and of a pinion rotating in a bearing fixed to the strut, a motor, preferably arranged so that it is offset towards the upstream transverse articulation so as to minimise inertia and the torque due to gravity exerted on this axis and which drives the pinion via a light shaft and flexible couplings if necessary.

The invention provides a mechanism which has an open and conical shape which, allied with the ability to optimise the shape of the components with very few constraints, means that it can fit the arm without enclosing it and bring the arm's longitudinal axis near to that of the mechanism. It avoids the need for a closed circular guide.

In addition, the overhang mass of the device according to the present invention relative to the transverse articulation of the limb is lower than for a rail on which a bearing mounted carriage moves, or a rail on which rollers move, since on the one hand the fixed part is located at the base of the arm at the cost of a negligible weight of rods, and on the other hand the moving part can be made, without any negative consequences, using light materials, since the stresses exerted by the rollers are small, due to the almost complete lack of a bending moment.

The mechanism of the invention decouples and distributes the various forces: the shear force is effectively supported by the strut, and the bending moments are effectively supported by the rods.

The mechanism may advantageously be supplemented so as to provide control over the wrist axes, therefore offering three degrees of freedom.

In one specific example, the longitudinal rotation mechanism therefore includes a plate which replaces one of the rods, where this plate bears two cable cylinders or actuators which have the same function, connected, on the one hand, to the moving part by two pivot links with orthogonal axes which may or may not be concurrent, and a set of pulleys concentric with each of these which allow cables to run towards the wrist, and on the other hand connected to the fixed part by a ball-joint, a ball-joint/pivot combination or a cardan joint/pivot combination.

The subject-matter of the present invention is therefore a rotation mechanism for a forearm which includes a moving stay designed to support a wrist, where the moving stay includes at least one guide track in the form of an arc of a circle, a fixed stay designed to support the rear end of a forearm, rods that are rigid lengthwise which link the moving stay and the fixed stay and which allow the moving stay to rotate relative to the fixed stay around a longitudinal axis, by means of articulated links which can rotate, and a strut which is rigidly linked at one of its ends to the fixed stay, and linked at its other end to a roller-bearing, whose rollers are in rolling contact with at least one guide track of the moving stay, where the rollers cause the moving stay to pivot around a longitudinal axis, where the direction of said longitudinal axis passes on the one hand through the centre of the arc of the circle of the guide track and on the other hand through the centre of a circle defined by the ends of rods linked to the fixed stay.

Advantageously at least one articulated link on each rod is a ball-joint link (or ball-joint combined with a pivot link, in order to increase the extent of the movement allowed in certain directions) or an equivalent link made up of three rotations around three axes, for example, a cardan joint combined with a pivot link which is concurrent with the centre of the cardan joint, or any other link or equivalent combination of links, and the other articulated link of each rod is a link which allows at least two rotations around two orthogonal axes whether concurrent (cardan joint) or not.

In one embodiment example the links which are articulated in rotation and which connect the rods to one of the moving stay or the fixed stay are ball-joint links (or ball-joint combined with a pivot link, in order to increase the extent of the movement allowed in certain directions) or an equivalent link made up of three rotations around three axes, for example, a cardan joint combined with a pivot link which is concurrent with the centre of the cardan joint, or any other link or equivalent combination of links, and where the articulated links connecting the rods to the other of the fixed stay or the moving stay are links which allow at least two rotations around two orthogonal axes whether concurrent (cardan joint) or not.

The articulated rods may be connected to moving and fixed stays as desired by two ball-joints or by a ball-joint and a cardan joint. Ball-joints may also be replaced by ball-joint/pivot or cardan joint/pivot combinations. In one preferential embodiment, the articulated rods are linked: to the moving stay by two pivot links with axis which are orthogonal and which may or may not be concurrent, and to the fixed stay by aforementioned ball-joint links or combined links with these also identical. A source of angular deviation on the transverse axes which would result from non-homogeneity of the links is therefore eliminated.

There are at least three rods which are rigid lengthwise. They allow a mechanism which is light and which has small overall dimensions to be realised.

The strut is advantageously made using a mesh of light bars, whose rigidity is such that the run-out of the moving part does not result in unwanted angular movements which are perceptible to the user.

The fixed stay is advantageously a segment of an arc of a circle whose radius is greater then that of the moving stay, so that it defines a mechanism with a truncated cone shape whose generatrices are the rods. This configuration allows the best possible fit to the shape of the human forearm.

The moving stay is capable of moving along the longitudinal axis relative to the rollers, as a consequence of the movement of the rods.

Longitudinal rotational guidance of the device in the invention may be coupled to an actuation system which causes the moving stay to rotate around said longitudinal axis; this actuation system may include, for example, a pinion which engages with a toothed segment which is firmly fixed to the moving stay, where the pinion is driven by an electric motor.

In another embodiment example, the actuation system includes a belt which engages on the one hand with a pinion and on the other hand with a toothed segment which is firmly fixed to the moving stay, where the pinion is driven by an electric motor.

In another embodiment example, the actuation system includes a reversible cable actuator driven by an electric motor.

In one embodiment variant the strut may include two lateral rods and one central rod, all three connected at one longitudinal end to the fixed stay and at the other end to a junction plate which bears the roller-bearing, where the central rod is a splined shaft, where the cable actuator includes a motor fixed to the fixed stay, a screw which is approximately parallel to the splined shaft, a nut mounted on the screw, a cable fixed to the screw and to the moving part, where the said nut is driven so that it rotates by the electric motor, a bush designed to slide on the splined shaft, where the bush is firmly fixed to the screw, so that it is prevented from turning.

The solid fastening between the bush and the screw is advantageously of the elastic type.

The motor drives the nut by means, for example, of a toothed belt passing around the splined shaft.

The roller-bearing advantageously overhangs over the junction plate, laterally offset in relation to the longitudinal axis, which allows the overall transverse dimensions to be reduced.

It may be envisaged, in one case, that the moving part includes grooves to guide the ends of the cables, with the form of these being such that they compensate for the intrinsic longitudinal translation movement of the moving part.

It may be envisaged, in another case, that the moving part includes grooves for guiding the ends of the cable, with the moving part being articulated around a transverse shaft in order to compensate for the intrinsic longitudinal translation movement of the moving part.

In an advantageous manner, the motor is fitted close to the fixed stay in order to reduce the overhang mass.

The mechanism according to the invention may advantageously include two transverse rotation articulations designed to reproduce the two articulations of the wrist, said articulations being located at the moving stay.

The mechanism includes, for example, a plate linked to the moving stay by two pivot links with orthogonal axes and linked to the fixed stay by a ball-joint link (or ball-joint combined with a pivot link, in order to increase the movement allowed in certain directions), or an equivalent link made up of three rotations around three axes, for example a cardan joint combined with a pivot link concurrent with the centre of the cardan joint, or any other link or equivalent combination of links, where said plate supports a first actuator capable of rotating a first segment around the wrist axis and a second actuator capable of rotating a second segment around an axis of the wrist, where the second segment is carried on the first segment.

The first and second actuators may advantageously be reversible cable cylinders, each including a cable formed into a loop and which passes along the plate up to the guide pulleys which are firmly fixed in rotation to the first and second segments respectively.

Advantageously the return pulleys have the same axis as that of one of the pivot links in order to prevent any variation in the length of the cable.

Advantageously, the cable cylinders are actuated by motors arranged on the plate as close as possible to the fixed stay, or fixed to the fixed stay, where each motor is then connected to each of the actuators by a flexible shaft or a shaft equipped with a coupling which is designed to tolerate extension.

Another objective of the present invention is an arm orthesis with five axes of rotation which includes a mechanism according to the present invention, connected to a segment designed to run alongside the arm.

Another objective of the present invention is an arm orthesis with seven axes of rotation which includes a mechanism according to the present invention, connected to a segment designed to run alongside the arm.

BRIEF DESCRIPTION OF THE DRAWINGS

The present invention will be more clearly understood with the help of the following description and the appended diagrams, in which.

DETAILED DESCRIPTION OF SPECIFIC EMBODIMENTS

The mechanism of rotation for the forearm orthesis according to the present invention is designed to hold a forearm 1, where the longitudinal axis of the forearm 1 is approximately the same as that of the mechanism.

The terms <<front>> and <<rear>> are to be used by analogy with the front and rear of the forearm. Thus front will correspond to the end designed to be at the hand end and the rear corresponds to the end designed to be at the elbow end.

Figure 1:
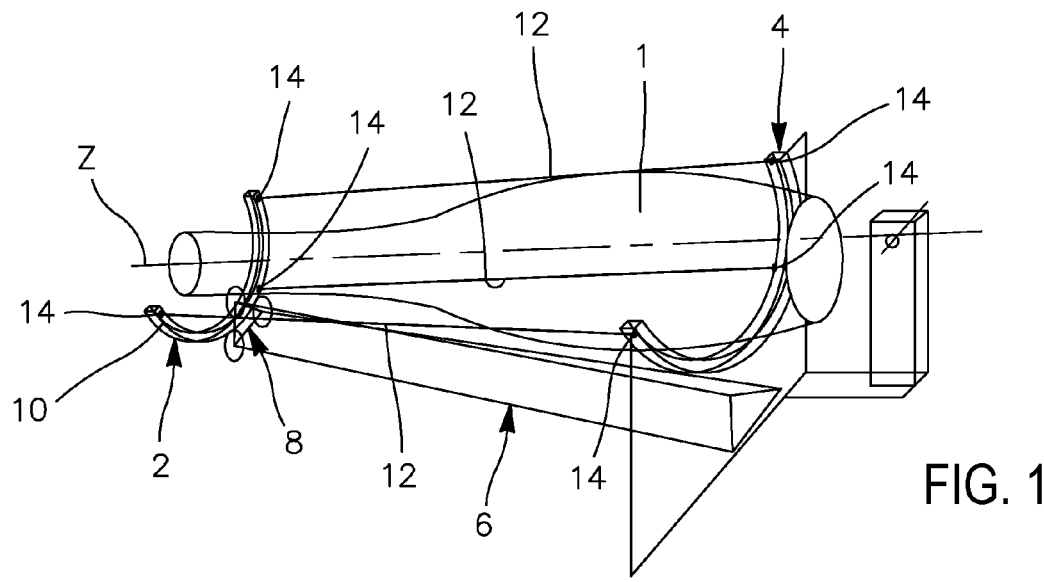
FIG. 1 is a schematic perspective representation of an embodiment example of a mechanism for rotational guidance around a longitudinal axis with one degree of freedom for a forearm orthesis according to the present invention.

The mechanism represented in FIG. 1 includes a front stay 2, a rear stay 4 and a rigid strut 6 which connects the front stay 2 and rear stay 4.

The front stay 2 or moving stay takes the form of a portion of the arc of a circle designed to be mounted so that it moves on the strut 6. The moving stay 2 is designed to pivot in a plane P which is approximately orthogonal to the axis of the fore-arm around a longitudinal axis Z which is approximately co-linear with that of the fore-arm 1.

The moving stay 2 is fitted so that it moves on the strut 6 by means of a roller bearing, made up of rollers 8, for example three rollers firmly fixed to the strut 6 and which roll in two concentric cylindrical tracks 10 formed on the moving stay 2. For example, two rollers 8 roll in an external track 10 of the moving stay 2 and one roller rolls on an internal track 10 of the moving stay 4, opposite the other two rollers 8.

The rollers 8 are mounted on the strut 6 by means of a bearing, with their axis being approximately parallel to the axis Z.

As will be seen in the remainder of the description, the engagement between the rollers 8 and the tracks 10 also allow the moving stay to move along Z.

The fixed stay 4 is rigidly fixed to the strut 6, using any suitable means, for example by embedding.

The strut 6 is, for example, made in the form of a mesh of light bars, whose rigidity is such that run-out does not result in unwanted angular movements which are perceptible to the user. The strut may be made, for example, of steel or carbon fibre.

Rods 12 which are rigid lengthwise longitudinally link the moving stays 2 and fixed stays 4. The rods are connected at each of their longitudinal ends to the moving stays 2 and fixed stays 4 by a link which is articulated in rotation. In the example shown, this articulated rotating link is a ball-joint 14.

The rod assembly 12 balances the bending moments.

At least one of the articulated links is either a ball-joint link (or ball-joint combined with a pivot link, in order to increase the extent of its movement in certain directions), or an equivalent link made up of three rotations around three axes, for example, a cardan-joint combined with a pivot link concurrent with the centre of the cardan-joint, or any other link or equivalent combination of links.

Figure 6A:
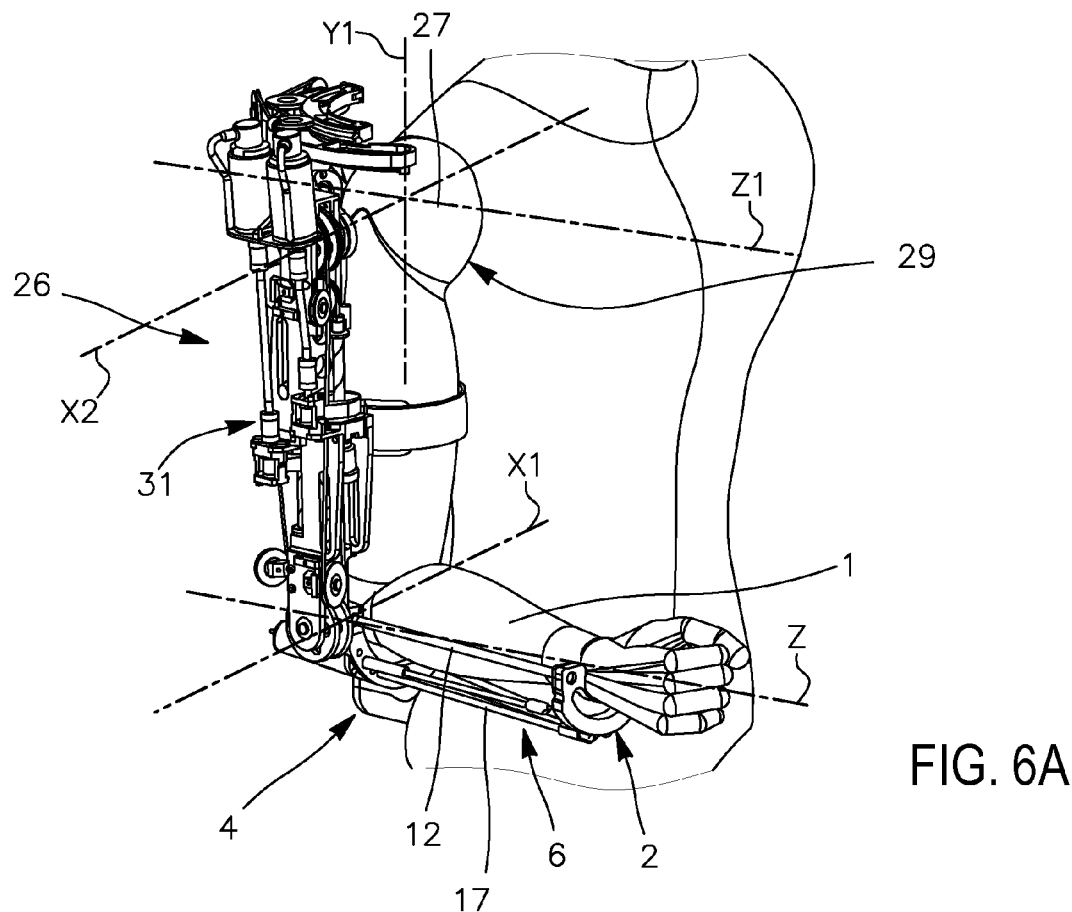
FIG. 6A is a perspective view of a five-axis orthesis according to the invention.
Figure 6B:
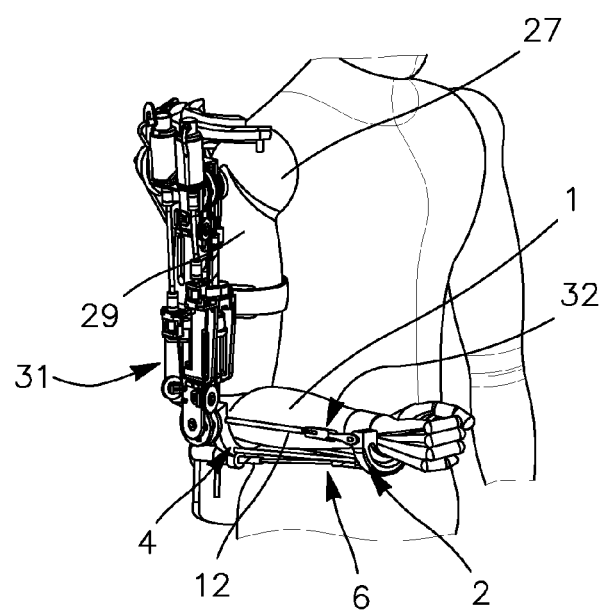
FIGS. 6B to 6D are respectively front, rear and detail perspective views of an orthesis according to the invention.
Figure 6C:
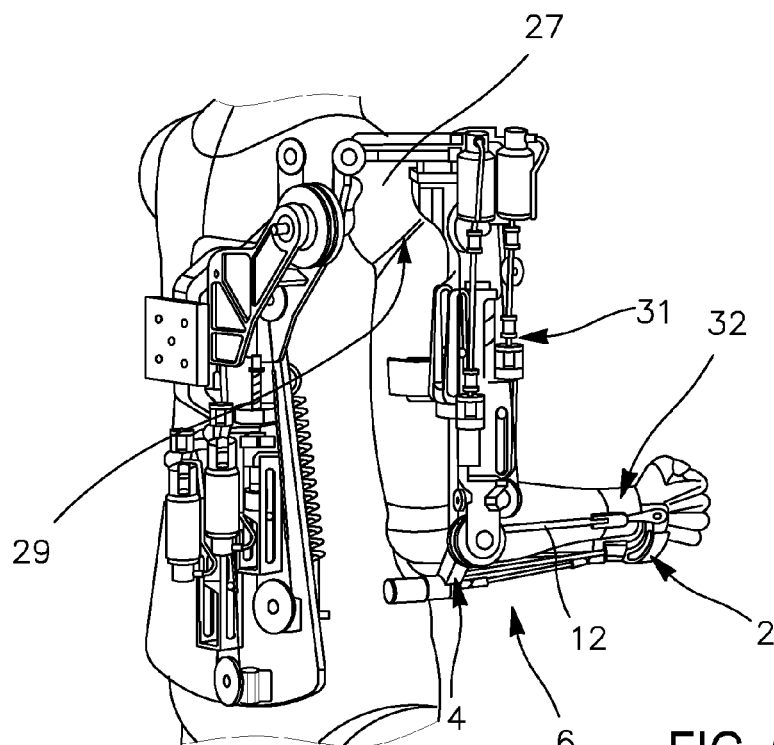
Figure 6D:
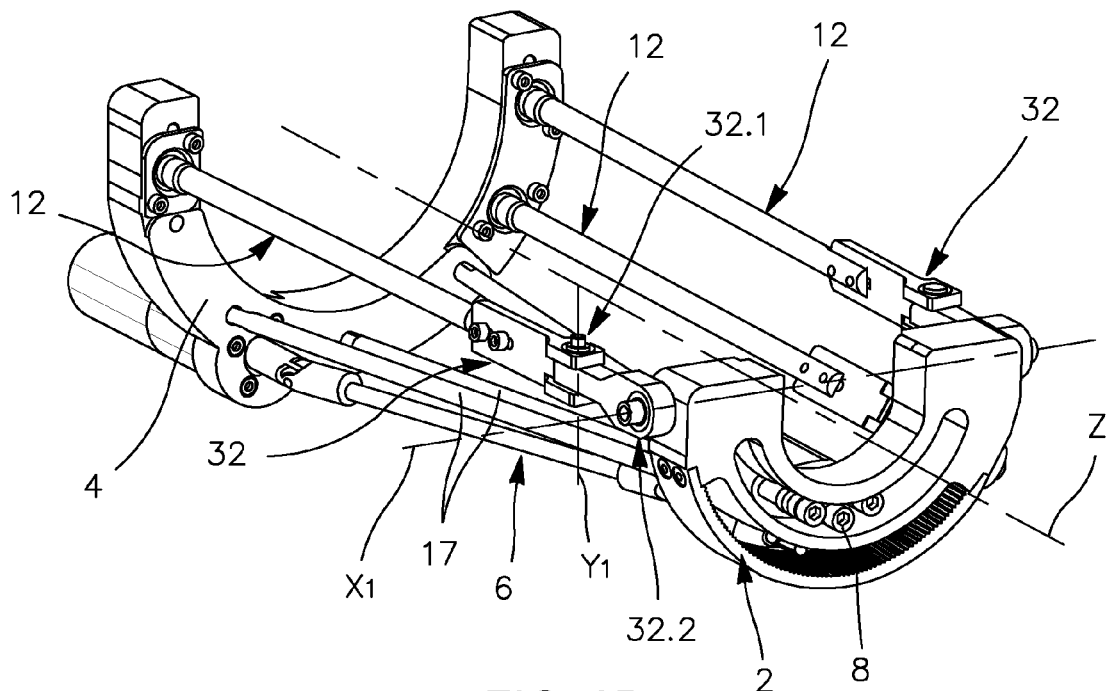

The other articulated link may also be of the ball-joint type, but an articulated link could simply be envisaged which allows two rotations around two orthogonal axes which are concurrent (cardan joint) or not, as shown in FIGS. 6B to 6D.

Advantageously, the rods 12 could be envisaged as being articulated on the moving stay by a cardan joint link combined with a pivot link and on the fixed stay by a cardan joint link. Thus the rods 12 equipped at both their ends with cardan joints may be manufactured industrially, allowing manufacturing costs to be reduced; cardan joints are in fact widely used links. The pivot is for example a ball-bearing pivot which is less bulky than a ball-joint link.

In fact it is not necessary for the rods 12 to be connected to the stays 2,4 by two ball-joint links. It is preferable, in this case, for the three rods to have ball-joint links at their ends connected to the same stay, and cardan joint links at their other ends. The links are advantageously homogeneous on each stay so as to avoid a source of additional angular deviation on the transverse axes.

Links made directly between the rod 14 and the fixed stays 4 and moving stays 2 could be envisaged using elastic articulations.

Advantageously the fixed stay 4 also takes the form of an arc of a circle, with a diameter which is greater than that of the moving stay 2, in order to demarcate an internal truncated cone shaped space similar in shape to the external contour of the forearm 1. The orthesis then has the approximate form of a truncated cone whose generatrices are formed from the rods 12.

In the remainder of the description we will consider, unless an exception is made, that the links between the rods 12 and the front stays 2 and rear stays 4 are ball-joint links.

The longitudinal axis Z of rotation of the mechanism passes through the notional centres at the moving stays 2 and fixed stays 4 defined by the three ball-joint links 14 which link the rods to the moving stays 2 and fixed stays 4. The notional centre of the ball-joint links on the moving link 2 is also the same as the centre of a circle from which the moving stay 2 comes. The notional centre of the circle is determined by the intersection of the perpendicular bisector of segments connecting the succession of ball-joints. In addition, when the mechanism is in its reference position, the anchorage points for the ball-joints or the anchorage axes for the cardan joints on the same rod are, by their construction, in the radial planes of the notional cone of the mechanism, which means that a source of angular deviation from the transverse axes is removed.

Since both transverse rotations at the moving stay 2 are prevented, the rods 12 balance the bending moment applied to the moving stay 2 and the strut 6 essentially transmits the transversal resultant or shear force.

Figure 2:
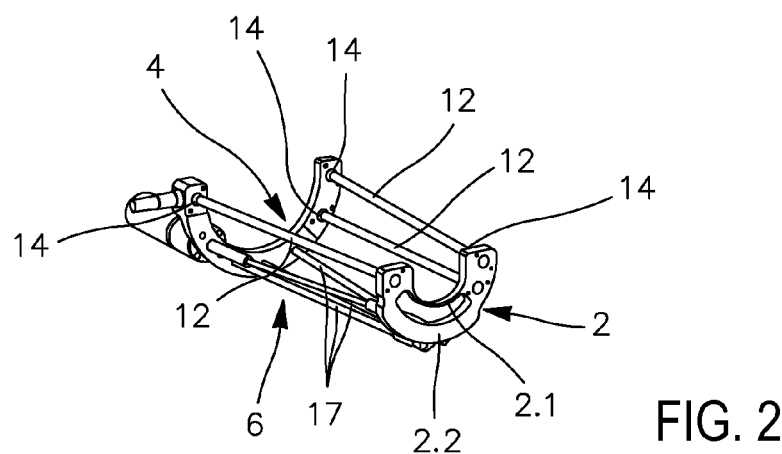
FIG. 2 is schematic perspective view of the mechanism in FIG. 1 in an industrial production embodiment.

In FIG. 2, an industrial production embodiment of the orthesis can be seen; in particular the moving stay 2 can be seen.

The strut 6 is formed of three rods 17 connected at one longitudinal end to the fixed stay 4 and at their other longitudinal end fixed to a junction plate which carries the roller bearing.

The ends of the rods 17 which are connected to the fixed stay 4 are arranged so that they form a triangle which reproduces the general form of the strut shown for example in FIG. 1.

In this example the latter includes an internal surface 2.1 which approximately matches the form of the wrist, thus when the forearm is placed in the mechanism, the wrist is supported transversely and in rotation longitudinally. The moving stay 2 includes two concentric cylindrical guide tracks 2.2 which engage with the rollers 8.

According to the present invention, this guide allows the moving stay 2 to move along the axis Z relative to the strut.

In effect, during the rotation of the forearm around its longitudinal axis, its length varies slightly, with this variation corresponding, in the case of a human forearm, to a few millimeters for an angle of rotation of 120°. The present invention allows such a movement to occur.

This longitudinal movement along Z is made possible thanks to guidance provided by the rollers and the cylindrical track.

Figure 3:
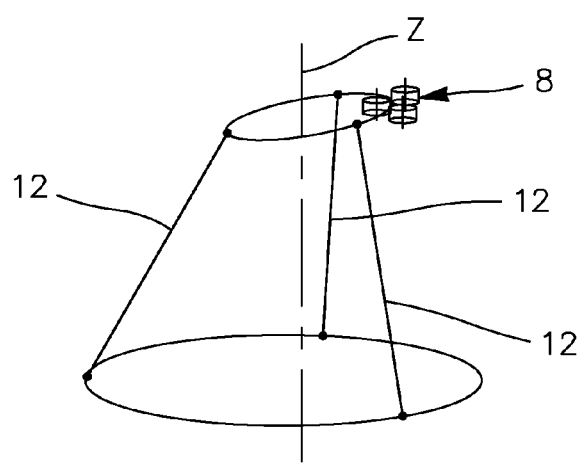
FIG. 3 is a schematic which represents the deformation of the mechanism.

In addition disturbances of both transverse axes due to angular oscillations occur as soon as there is eccentricity of the moving stay 2 in relation to the fixed stay 4, in particular due to machining uncertainties and/or deformation of the structure under load, as shown schematically in FIG. 3.

It is preferable to minimise the amplitude of the oscillations by restricting the bending of the strut under load so that:
  they remain imperceptible to the user,
  they do not result in jamming if operating play proves necessary between the rollers and the moving stay.
  they do not result in excessive stresses on the mechanism if pre-stressing is necessary between the rollers and the moving stay in order to ensure that geometric requirements are rigorously met for example in the case where a gear-drive is used; in this case a ball-joint type device could be envisaged between the roller bearings and the strut, for example a ball-joint or an equivalent flexible component, allowing them to be kept in contact under low stress.

The forearm mechanism according to the present invention also includes drive means 15 which induces rotation around the Z axis.

Figure 4:
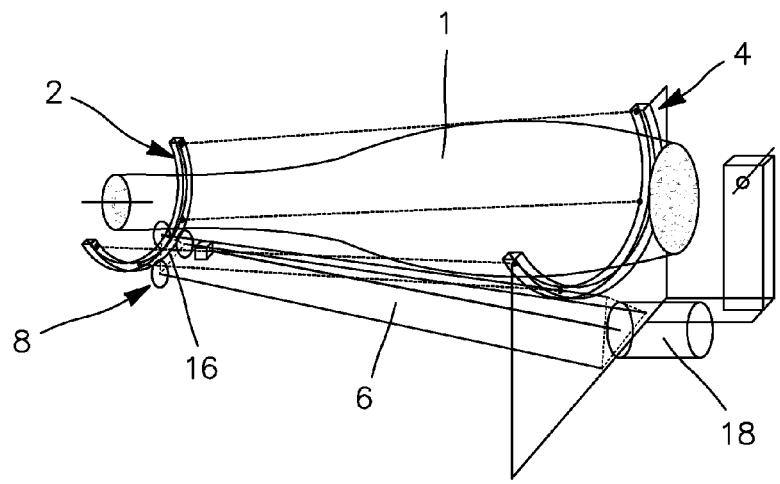
FIG. 4 is schematic representation of the mechanism in FIG. 1 equipped with a gear drive actuator.

Advantageously, as shown in FIG. 4, the drive means 15 include a toothed pinion 16 mounted on the strut 6 which engages with a toothed segment (not visible) fixed on the moving stay 2. Thus rotation of the pinion 16 causes the moving stay 2 to rotate around the Z axis.

The toothed pinion 16 is made to rotate by an electric motor 18 fixed to the fixed stay 4. Advantageously the motor 18 is fixed at a rear end 6.1 of the strut 6 in order to reduce the overhang mass in the direction of the moving stay 2, and consequently of the front end of the forearm.

Transmission between the motor 18 and the toothed pinion 16 is therefore obtained by means of a flexible shaft and flexible couplings or cardan couplings 19.

This transmission system allows the inertia of rotation around the longitudinal axis to be further reduced.

A toothed belt could also be used to drive the toothed segment carried on the moving stay 2.

Figure 5:
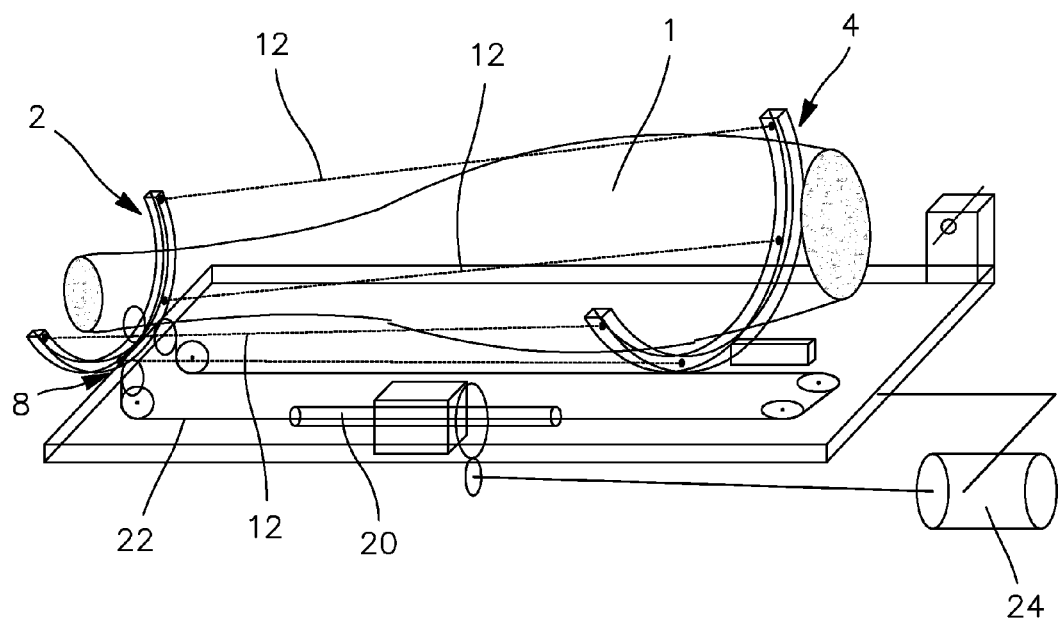
FIG. 5 is schematic representation of the mechanism in FIG. 1 equipped with a cable cylinder actuator.

As shown in FIG. 5, a cable cylinder could also be used to drive the moving stay 2.

The cable cylinder includes a hollow threaded rod 20 inside which a cable 22 which forms a loop is fitted. A nut, made to rotate by a motor 24, moves the hollow threaded rod 20 longitudinally in parallel to the Z axis. The cable 22 causes rotation of the rollers 8 or a pinion which engages with a toothed sector which is solidly fixed to the moving stay 2.

The operation of a cable cylinder is explained in detail in, for example, the article "Une nouvelle technologie d'orthèse portable ('a new portable orthesis technology')" in Handicap 2004, p. 170-175 as well as in patent FR2809464.

This type of drive is appropriate since offers sufficient tolerance in the axial movement required and an adequate force capacity. It possesses, however, greater volume and weight than a simple gear drive.

The use of a cable capstan could also be envisaged to provide such a drive.

The forearm rotation mechanism according to the present invention is entirely suitable for the realisation of a five-axis orthesis as represented in FIGS. 6A to 6D.

The orthesis 26 extends from the shoulder 27 to the forearm 1. One refers to five axes since a segment 31 designed to run alongside the arm 29 reproduces the three shoulder-arm articulation axes X2, Y1, Z1 similar to a ball-joint link, and one axis of rotation X1 of the articulation between the arm 29 and the forearm 1. The longitudinal axis of rotation Z of the forearm is reproduced by the mechanism according to the invention, which is connected to the segment 31.

In FIG. 6A the rods 12 which are rigid lengthwise are linked to the fixed rigid stays by ball-joint links 14.

The strut 6 is formed of three rods 17 connected at one longitudinal end to the fixed stay 4 and at their other longitudinal end fixed to a junction plate which carries the roller bearing.

The ends of the rods 17 which are connected to the fixed stay 4 are arranged so that they form a triangle which reproduces the general form of the strut shown, for example, in FIG. 1.

In FIGS. 6B to 6D, each of the rods 12 which are rigid lengthwise is connected to the fixed stay 4 by a ball-joint link 14 and to the moving stay by a link 32 formed by a first pivot link 32.1 with an axis of rotation Y1 (vertical in the representation in FIG. 6D) and a second pivot link 32.2 with an axis of rotation X1 (horizontal in the representation in FIG. 6d), where the axes X1 and Y1 are offset (not concurrent).

In the example shown in FIGS. 6B to 6D, the rod 12 is rigidly attached to a fitting of the first pivot link 32.1.

This orthesis 26 allows a number of tasks to be carried out in which the angular movements of the two terminal axes of the wrist are not decisive. This orthesis has a cost-effectiveness ratio which is of interest, since being in effect less complex it has a lower cost.

As may be seen in FIGS. 6A to 6D, the five axis orthesis according to the invention possesses a form which matches the human body well without confining it.

The orthesis advantageously uses cable cylinders to perform at least some of the rotations around other axes of rotation. Therefore, thanks to the technology of its cable cylinder type actuators, it provides integral force feedback which allows hybrid control of force and position, protection against excessive forces and the ability to balance the human arm/orthesis assembly without preventing the operator's movements.

Figure 7:
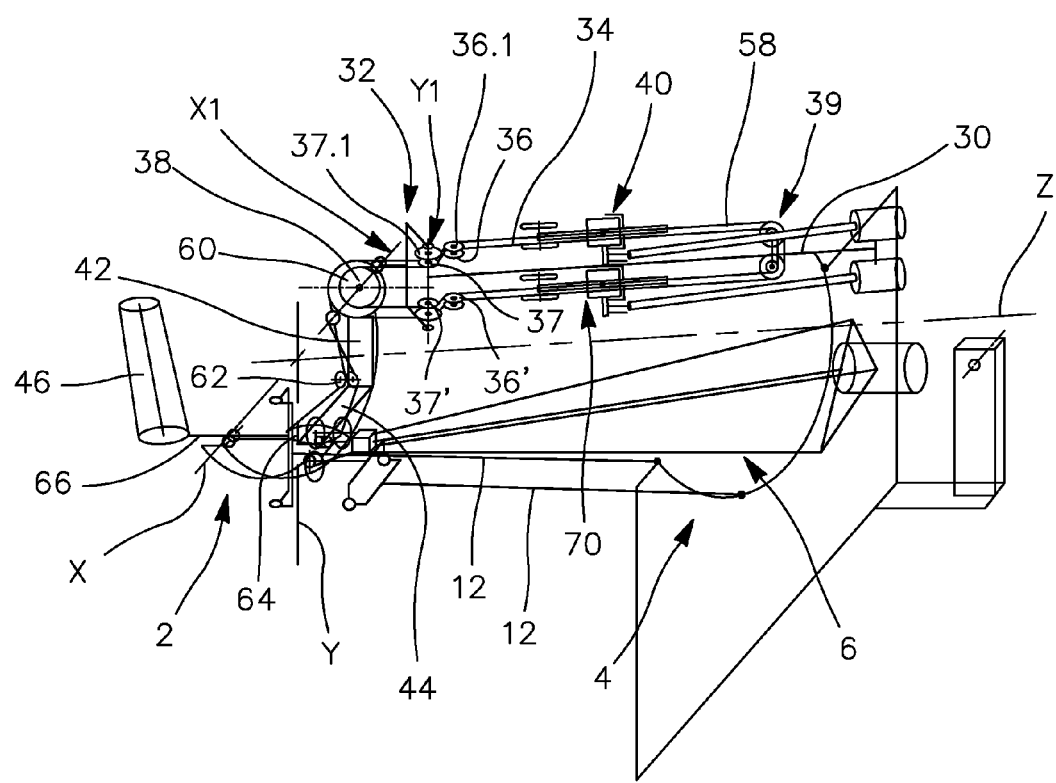
FIG. 7 is a schematic representation of an embodiment example of a forearm with three degrees of freedom for an orthesis according to the present invention.

In FIG. 7 the forearm rotation mechanism combined with means of achieving the two axes of rotation of the wrist can be seen.

The wrist has two axes of rotation which are orthogonal to each other and orthogonal to the axis of rotation of the forearm. The wrist, from a mechanical point of view, can be compared to a cardan joint linking the forearm to the hand.

The forearm mechanism according to FIG. 7 includes, instead of one of the rods 12, a plate 30 which links the fixed stay and the moving stay 2, and on which are fixed means of control over the two axes of rotation of the wrist.

In an advantageous manner, the plate 30 is linked to the moving stay 2, not by a ball-joint link but, in a preferable manner, by a link 32 formed by the combination of two pivot links with orthogonal axes X1, Y1, providing longitudinal stability of the plate whilst removing the rotational degree of freedom over its longitudinal axis along the Z axis. In addition, in the case where both rotations are achieved using cable cylinders, the cable path passes over guide pulleys mounted concentrically on the two axes of the two pivot links with orthogonal axes, as will be described.

The plate 2 is mechanically linked to the fixed stay 4 by a ball-joint link, a combined ball-joint/pivot link or a combined cardan joint/pivot link or any other link or equivalent combination of links.

The transverse axes of the wrist to be reproduced will be designated X and Y in the following description; these axes X,Y are orthogonal to each other and to the longitudinal Z axis.

We will first of all describe the means used to obtain rotation around the X axis.

In a preferred manner, actuation around the X axis is achieved using a cable actuator 40 which moves a cable 34. The cable 34 offers the advantage of providing a simple return angle with practically no losses. In addition it offers low inertia and reduced friction.

The cable 34 is a closed loop and firmly attached to the cable actuator 40 fixed to the plate 30.

The cable cylinder is particularly advantageous because of its longilinear shape which suits the shape of the forearm and the large forces achieved which match the reduced dimensions of the guide pulleys for the two axes of the wrist which will be described below. In addition, this type of actuator makes the forearm completely suitable for force feedback by offering a low threshold and high force output.

In what follows the forwards direction will designate the direction from the forearm towards the wrist and the return direction the direction from the wrist towards the forearm.

In the embodiment example shown, the cable 34 passes in the forwards direction along the plate 30 by means of a pulley 36 up to a return pulley 37 with an axis Y1, then up to a guide pulley 38 which is coaxial with the axis X1 of the pivot link 32.2, to which it is firmly fixed in rotation. The axis X1 in this embodiment is the same as that of the axis X.

Then, in the return direction, after turning around the pulley 38, it is wound over a second return pulley 37' with an axis Y1, then passes over another pulley 36', coaxial with pulley 36, and is led to the rear of the actuator by guide pulleys 39.

The pulley 38 is mounted, so that it is free to rotate, on a front end of the plate 30.

Figure 10A:
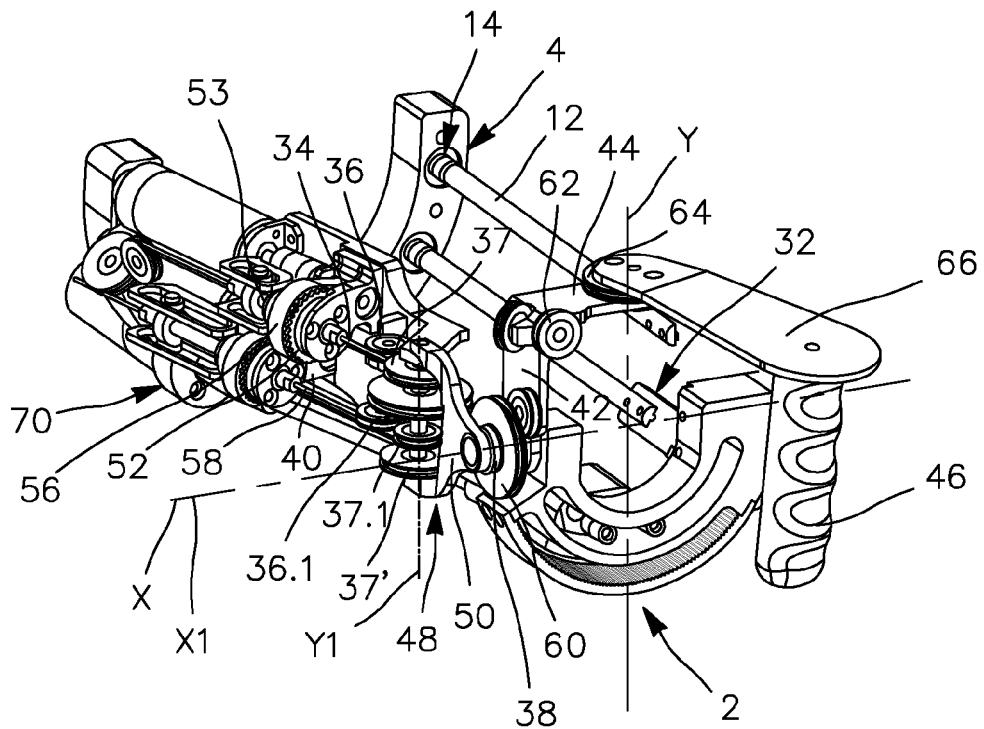
FIG. 10A is perspective view of the mechanism in FIG. 7 in an industrial production embodiment.

A first segment 42 is fixed to the pulley 38, perpendicular to the axis X1 and extends upwards and away from the moving stay 2 which can be seen in FIG. 10A.

A second segment 44 is fixed orthogonally to the first segment 42 to which a handle 46 is fixed.

The pulleys 37, 37' are fitted on an axis of a yoke 48 and the pulley 38 is fitted so that it rotates on one plate 50 of the yoke 48.

In the example shown, the cable actuator 40 is fitted onto the plate 30 in such a manner that the cable 34 extends along an axis which is approximately parallel to the Z axis, but this configuration is in no way restrictive. In effect, the guide pulleys ensure that the cable is appropriately aligned.

The cable actuator 40 includes a frame, a hollow screw 53 screwed into a nut 52 mounted on a bearing which rotates relative to the frame, a motor designed to drive the nut 52 by means of a notched belt 56, if necessary by a hollow motor which drives the nut concentrically, means of preventing rotation of the hollow screw which allow the hollow screw to move longitudinally parallel to the axis Z. The means of preventing rotation are of a known type and will not be described in detail. Reference may be made to the article "Une nouvelle technologie d'orthèse portable>>, Handicap 2004, p. 170-175, for further details of this type of longilinear actuator, as well as to patent FR2809464

The ends of the cable are anchored in the grooves of the drive pulleys so as to form a loop and on the other hand the cable is anchored at a point located inside the hollow screw near its mid point. Thus the operation of the motor causes the nut to rotate and the hollow screw to move parallel to the Z axis, which drives the cable 34, also in parallel with the Z axis.

The means used to obtain rotation around the Y axis will now be described.

A cable 58 is also used. This passes in the forwards direction along a pulley 36.1, turns around the axis Y1 by means of a guide pulley 37.1, then passes over another guide pulley 60 with an axis parallel to that of the pulley 38, then passes along the first segment 42, turns around a guide pulley 42, then winds around a drive pulley 64 with an axis Y and to which it is fixed so that when it moves it causes the pulley 64 to rotate, and vice versa.

The pulley 64 is mounted so that it is free to rotate at the end of the second segment 44, to which a third segment 66 is firmly fixed in rotation with an axis parallel to the Z axis, with the handle 46 with an axis approximately parallel to Y being fixed to the free end of the third segment 66.

The cable 58 returns to the rear of the cable cylinder 30 by means of pulleys with axes parallel to the pulleys 36.1, 37.1, 60, a guide pulley 63 is also envisaged, located at the guide pulley 62, where its axis is inclined relative to that of pulley 62 in order to bring the cable 58 towards the pulley with an axis parallel to pulley 60.

In a general manner known to those working in the field, when passing axes X1 and Y1, it is preferable for the forward and return strands of the cable to rest on guide pulleys on either side of their axes so that the cable length is kept constant. This routing will be described with reference to FIGS. 13A to 13C and 13A'.

The cable 58 is anchored in a hollow screw of a cable actuator 70 similar to the cable actuator 40, and will not be described in detail.

The cable actuator 70 is mounted on the plate 30 parallel to the cable actuator 40, with cable 58 on a path which is approximately parallel to that of the cable 34, although this is not a restrictive condition. It could in fact be envisaged that it follows a non-parallel path, depending on the configuration of the mechanism.

Figure 8:
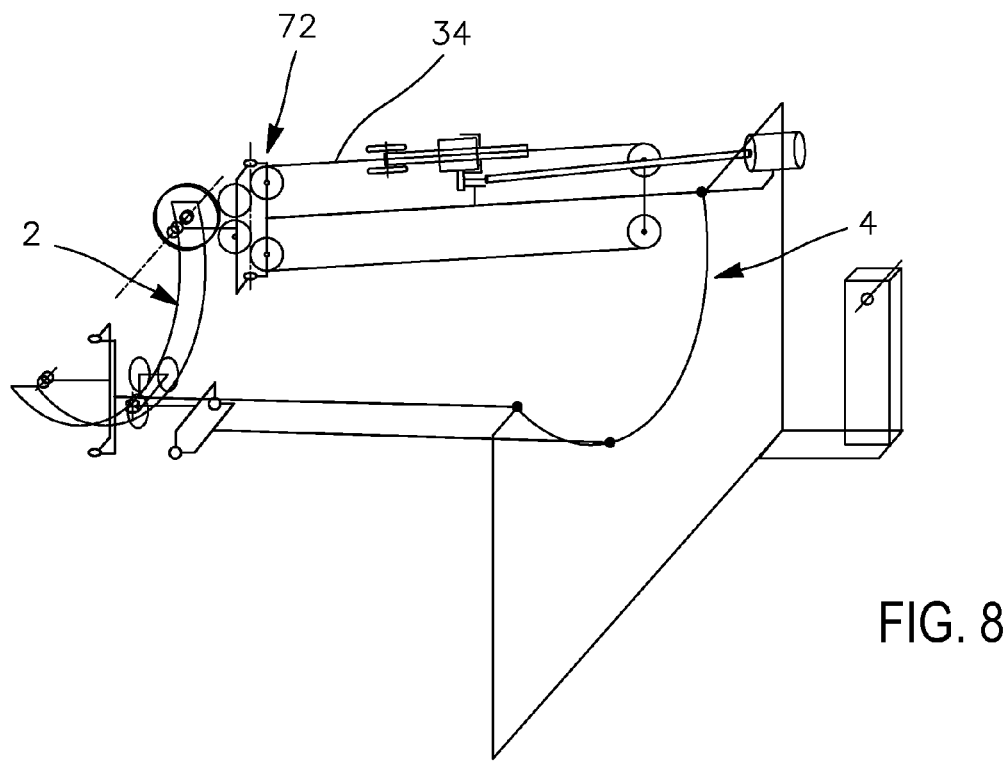
FIG. 8 is schematic representation of a variant of the mechanism in FIG. 7.

In FIG. 8, an embodiment variant of the device in FIG. 7 may be seen, in which the Y1 axis is passed by means of pulleys 72 in the axis which is orthogonal to the axis Y1, which brings the cable into the alignment of Y1.

This embodiment variant removes the torque on the axis Y1; it produces, however, a slight variation in the length of the cable and therefore a slight variation in the tension in the cable.

The motors are preferable offset close to the fixed stay, thus reducing their speed of rotation and therefore their effect on the inertia of rotation of the forearm.

As shown in FIG. 8, the motors could also be envisaged as being fixed, mounted directly on the fixed stay in order to further reduce the inertia. This assembly is possible if a flexible shaft 74 or a rigid shaft 76 fitted with a coupling that can tolerate extension, of the bellows coupling type or splined shaft type is used.

One embodiment variant of the mechanism involves replacing both pivot links 32 either by two ball-joints or by a combined ball-joint/pivot link or a combined cardan joint/pivot link or any other link or equivalent combination of links. In this case an angular deviation may occur as a result of the non-homogeneity of the links but it may be restricted sufficiently by separating the two ball-joint rods 12 from the plate 30.

In FIG. 10A an industrial production embodiment of the mechanism can be seen which reproduces the three axes of the forearm and of the wrist, with the cables 34 and 58 only being represented around the cable actuators 40, 70 respectively.

The strut 6 is formed of three rods 17 connected at one longitudinal end to the fixed stay 4 and at their other longitudinal end fixed to a junction plate which carries the roller bearing.

Figure 9:
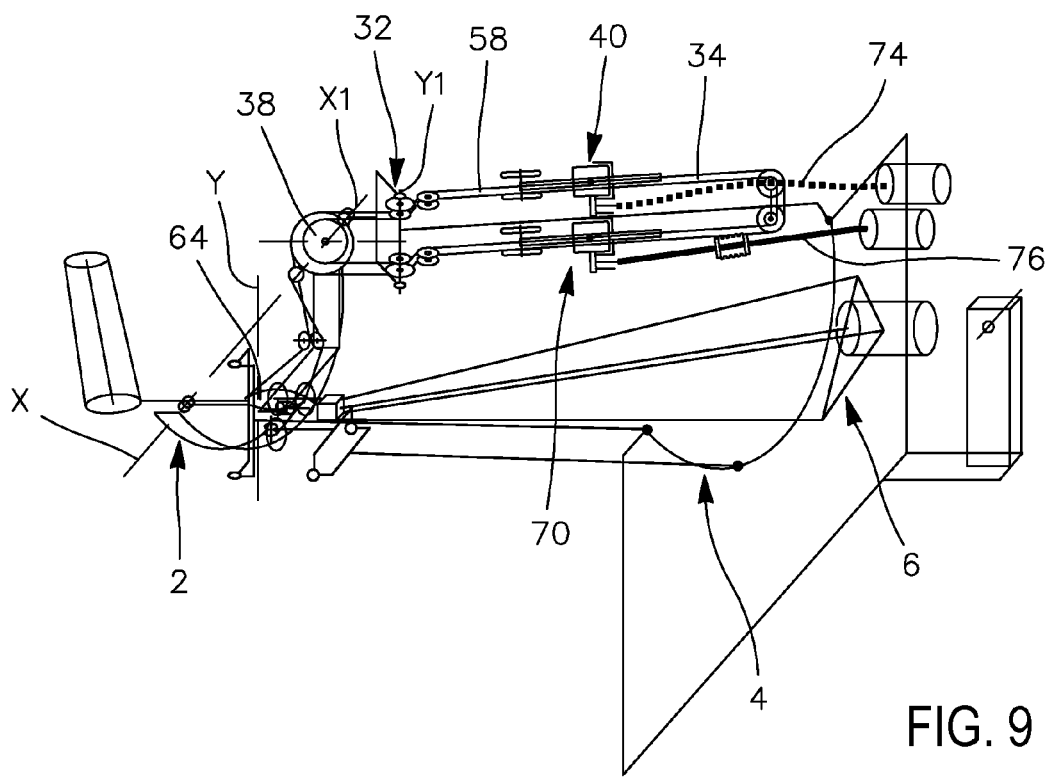
FIG. 9 is schematic representation of a variant of the mechanism in FIG. 7, in which the motors are fixed.

The ends of the rods 17 which are connected to the fixed stay 4 are arranged so that they form a triangle which reproduces the general form of the strut shown, for example, in FIG. 9.

Figure 10B:
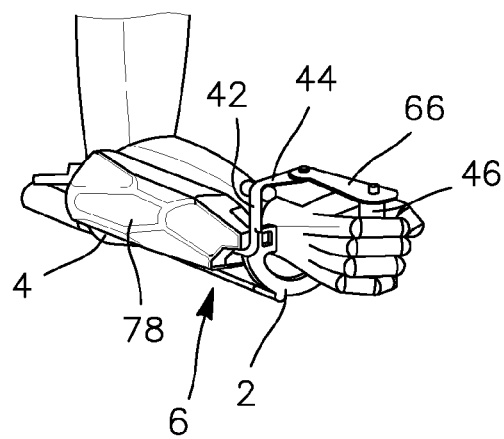
FIG. 10B represents the same view as that in FIG. 10A, where the mechanism includes a protective cover.

In FIG. 10B the mechanism including a protective cover 78 mounted on a forearm can be seen. Its small overall dimensions can therefore be seen.

The two wrist cardan joint control cables undergo a coupling effect due to the angular motion of the rods 12 which produces a small angle on the one and on the other of axes X1, Y1 offset from the link 32. Its total effect combines the effect on each axis X1, Y1 itself proportional to its angle. The effect is non-linear due to the geometrical non-linearity of the angles relative to the angle of rotation of the forearm. In this case this effect may be easily compensated for by a conventional control equation calculated in real time, rigorously or approximated by a polynomial.

The cable loop 58 which controls the Y axis of the wrist cardan joint crosses the axis X by means of guide pulleys and is therefore linearly coupled to this axis and it is compensated for simply and in a known manner, using linear decoupling (transmission matrix).

In order to reduce the angular kinematic deviations over the two transverse axes involved in replacing a rod 12 with the plate 30, which forms an heterogeneous component, the offset of axes X1, Y1 of the link 32 from the cable path is reduced and the two ball-joint rods 12 are moved further away. These deviations may be restricted to about 1° for a system which has the proportions of a human forearm. This defect may be made tolerable by providing an axial guide for the moving stay along the Z axis using the rollers.

FIGS. 12A to 12F show one embodiment variant of the device according to the present invention.

This embodiment differs from the embodiments already described in that the cable cylinder is incorporated in the strut, making the mechanism less bulky.

The device includes a fixed stay 2 and a moving stay 4 linked together by rods 12 and a strut 6'.

The strut 6' differs from the struts described previously in that it includes three rods, the central rod of which is made up of a splined shaft 82. The three rods are fixed directly to the fixed stay 4 at a longitudinal end, and are fixed at their other end to a junction piece 81, to which the roller bearing is fixed.

The cable cylinder includes an electric motor 18 fixed to the fixed stay 4, whose motor shaft 84 is parallel to the splined shaft 82, a nut 85 driven by the electric motor by means of a notched belt 86, a screw 88 which fits into the nut 85, where the screw has an axis which is parallel to the splined shaft 82, a cable loop containing a first cable strand 90 and a second cable strand 92.

The first cable strand 90 is fixed at a first end 90.1 to a free end 88.1 of the screw aligned in the direction of the moving stay 2, and fixed at a second end 90.2 to the moving stay 2, and a second cable strand 92 fixed at a first end 92.1 to a second free end 88.2 of the screw, and a second end 92.2 fixed to the moving stay 2.

Figure 12A:
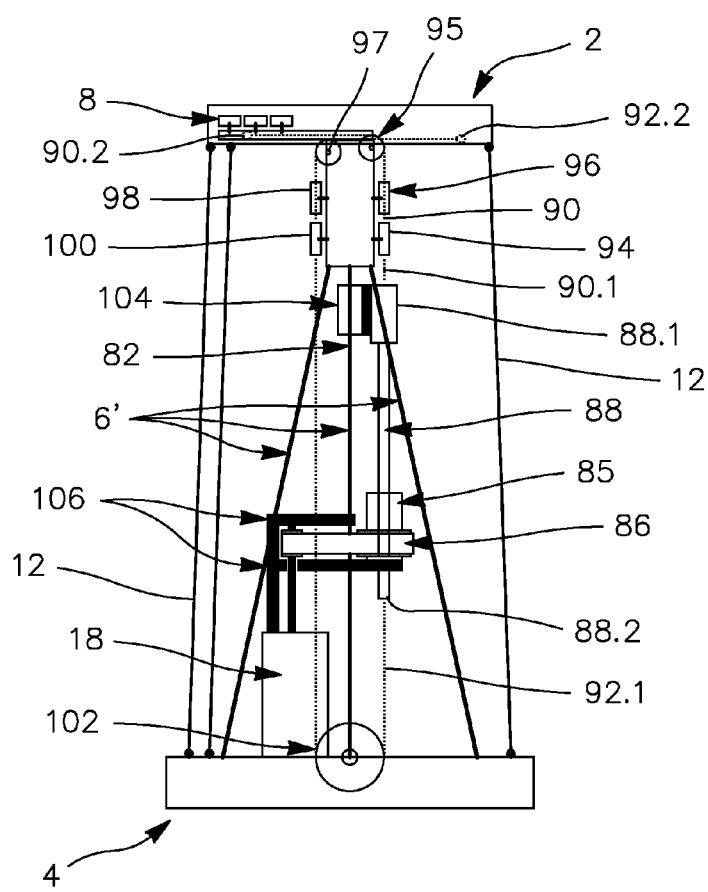
FIGS. 12A and 12B are schematic representations from above and from the side of an embodiment variant of a mechanism according to the present invention.
Figure 12B:
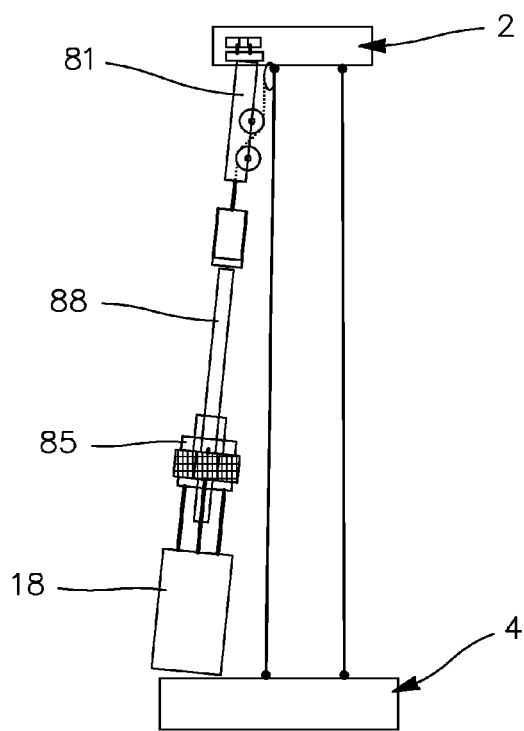
Figure 12C:
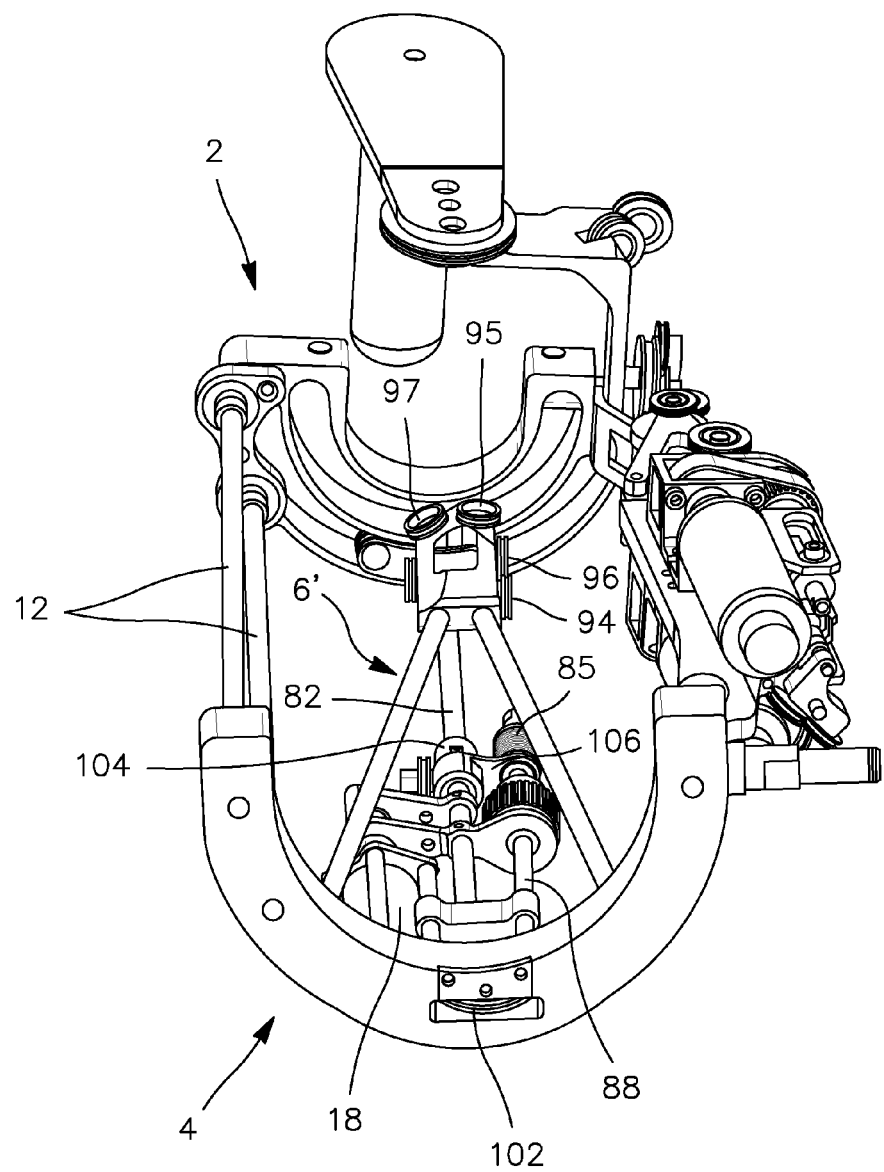
FIGS. 12C to 12F are views of an industrial production embodiment of the variant in FIGS. 12A and 12B, in three-quarters isometric perspective from above and from the side respectively.
Figure 12D:
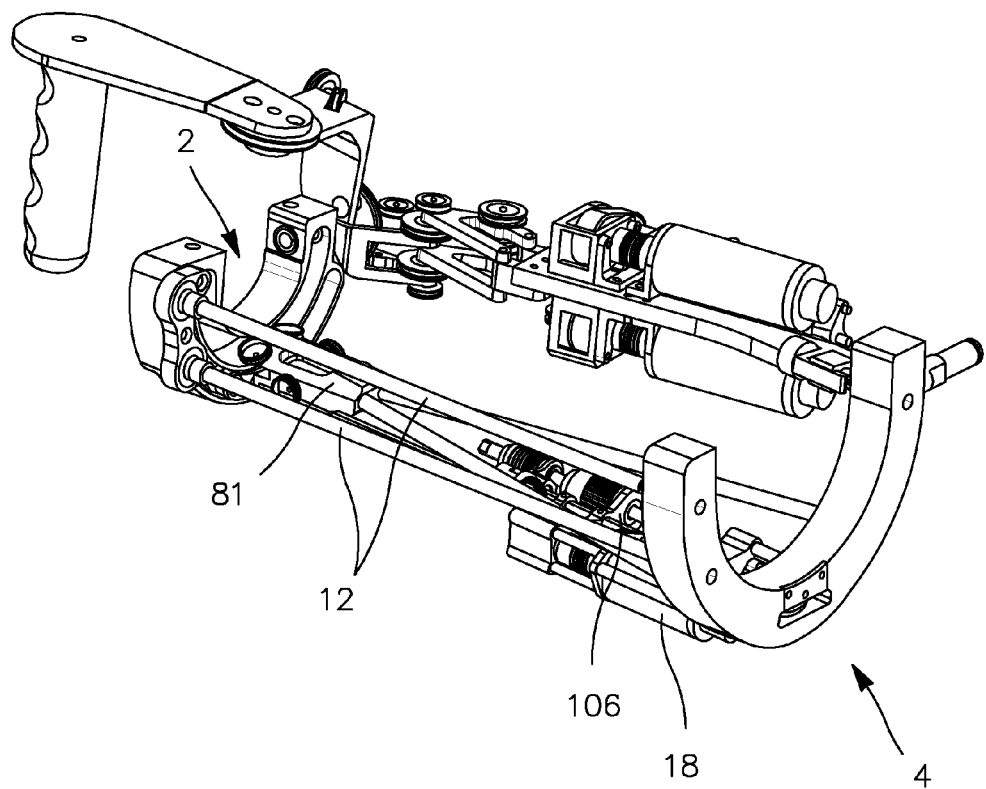
Figure 12E:
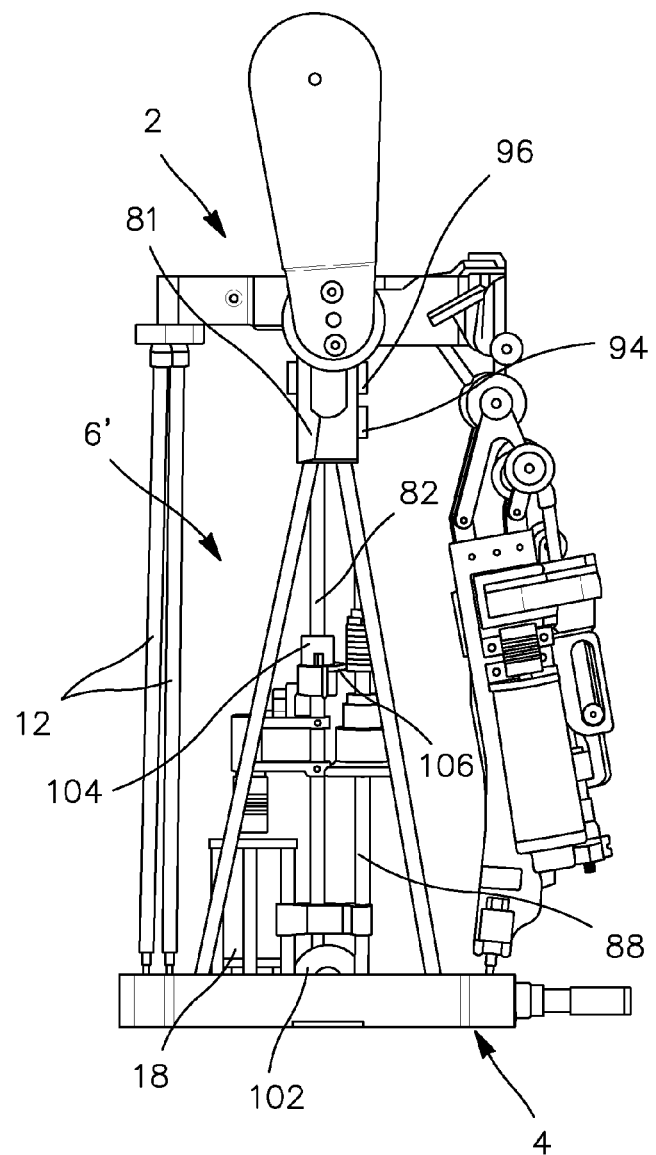
Figure 12F:
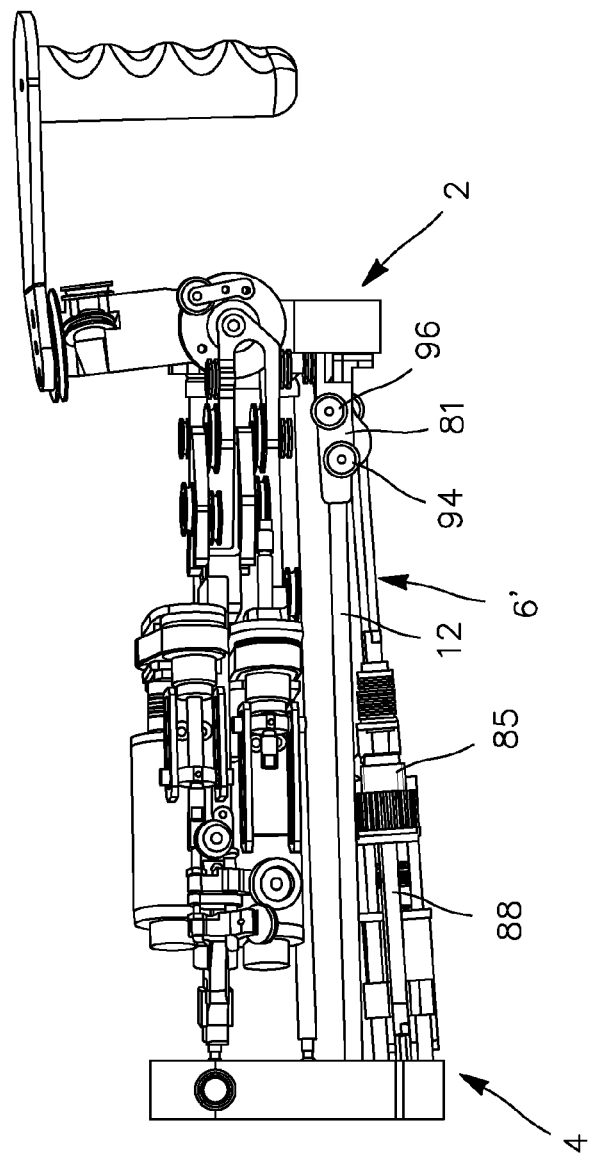

The first cable strand 90 passes between two deflecting pulleys 94, 96 fitted on a first lateral edge of the junction piece 81, where their axis is parallel to the X axis. The function of the pulleys 94, 96 is to provide a parallel deviation of the course of the first cable strand, as can be seen in FIG. 12B.

The first cable strand is then deflected at a right angle by a pulley 95 mounted on the junction piece 81. The pulley 95 is in a plane which is at a tangent to the cylindrical portion on which the cable is laid.

The second cable strand 92, from the moving stay 2, is deflected at a right angle by a pulley 97, then passes between two deflecting pulleys 98, 100 mounted on a second lateral edge of the junction piece 81, opposite the first lateral edge. The function of the pulleys 98, 100 is to achieve parallel deflection of the path of the second cable strand. The pulley 97 is in a plane which is at a tangent to the cylindrical portion on which the cable is laid.

The second cable strand then passes along the splined shaft 82 up to a pulley 102 which sends the second cable strand back to the second end of the rod 88.

The mechanism in FIGS. 12C to 12F includes only one pulley 98. Pulleys 94, 96, 98, 100 are not automatically necessary and some pulleys may be omitted depending on the embodiment, as is the case, for example, with pulley 100.

The cable actuator also includes a bush 104, mounted so that it has translation movement on the splined shaft, preferably mounted on re-circulating ball bearings in order to reduce friction. The bush 104 is designed so that it moves longitudinally around the shaft, but cannot turn along the shaft because of the splined form.

The bush 104 is firmly attached to the screw 88 at its first end 88.1 by means of a coupling 106. The means of coupling 106 is, for example, a metal bellows-type coupling which offers sufficient bending flexibility.

The bush provides a guide for the screw parallel to the X axis and prevents rotation of the screw.

In an advantageous manner, the coupling between the bush and the screw is an elastic coupling, which compensates for defects in the degree of parallelism and allows the screw to oscillate in relation to the nut. The coupling takes up any defects in parallel alignment which might adversely affect such a structure, especially in the light of the relatively long length of the screw. Furthermore, as regards the angular oscillation of the screw, the bush sliding on the splined shaft prevents angular bending of the coupling, unlike an anti-rotation system using rollers. The bush only allows transverse flexibility in translation movement.

The cylinder also includes a frame 106 which is fixed to the motor, made up of two flanges extending on either side of the belt, where one flange is fixed to the splined shaft and where the other supports the rotary bearing which guides the hub carrying the nut.

The belt 86 advantageously passes around the splined shaft 82, which restricts the overall bulk.

In this embodiment it is envisaged that the connection between the rods 12 and the moving part extends onto the tracks 10, which allows the overall transverse dimensions of the mechanism to be reduced.

In order to avoid any interaction between these ball-joint links and the strut 6', it is envisaged that the roller-bearing is fixed overhanging the junction piece 81. It is also envisaged that it is moved towards where the closest two bars 12 are attached, on the left in FIG. 12D, and to offset it to the rear of the plane of connection between the moving part 2 and the rods 12, enabling the degree of movement of the rods 12 to be increased.

As described previously, the ends of the cable strands are fixed to the moving part, for example by means of crimps anchored in the moving part. It is advantageously envisaged that the moving part 2 includes suitably shaped grooves (not visible) in order to compensate for the intrinsic longitudinal translation movement of the moving component 2 and to allow the cable to be placed with minimum lateral slipping. The cable is held laterally in the groove, preventing any variation in its length. In effect, variation in the length would manifest itself as a variation which is prejudicial to the cable tension as it travels around and would reduce the precision of the mechanism.

The grooves have, for example, a spiral form.

Alternatively one could envisage that the moving piece is mounted so that it is articulated around the X axis, which would allow grooves of a conventional form to be used.

Thanks to this cable actuator, the overall dimensions of the assembly can be reduced by omitting the pairs of rolling-roller symmetrical grooves of known cable actuators. In effect, a cable actuator of known type uses, on the one side, a groove which would be wider than the splined shaft, and on the other side an opposite groove, which would be added symmetrically in relation to the screw. The overall dimensions would therefore be significantly increased. Thus the splined shaft acts as an asymmetrical rotation prevention system which is particularly well suited for this cable actuator.

Figure 13A:
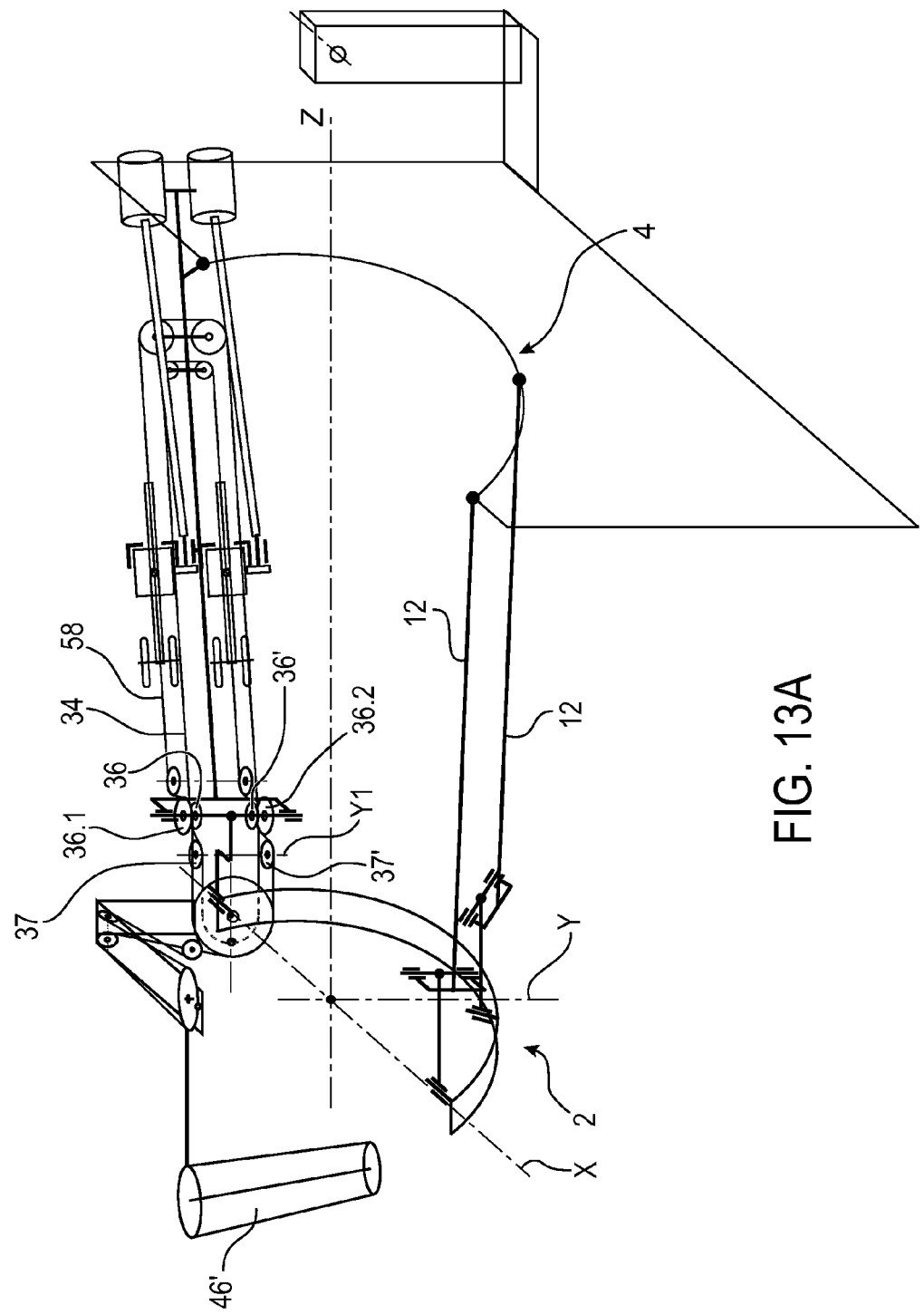
FIGS. 13A to 13C are schematic representations of embodiments variants of mechanisms according to the invention, in which the paths of the drive means cables around the X and Y1 axes have been modified, FIG. 13A' is a detail view of FIG. 13A.
Figure 13B:
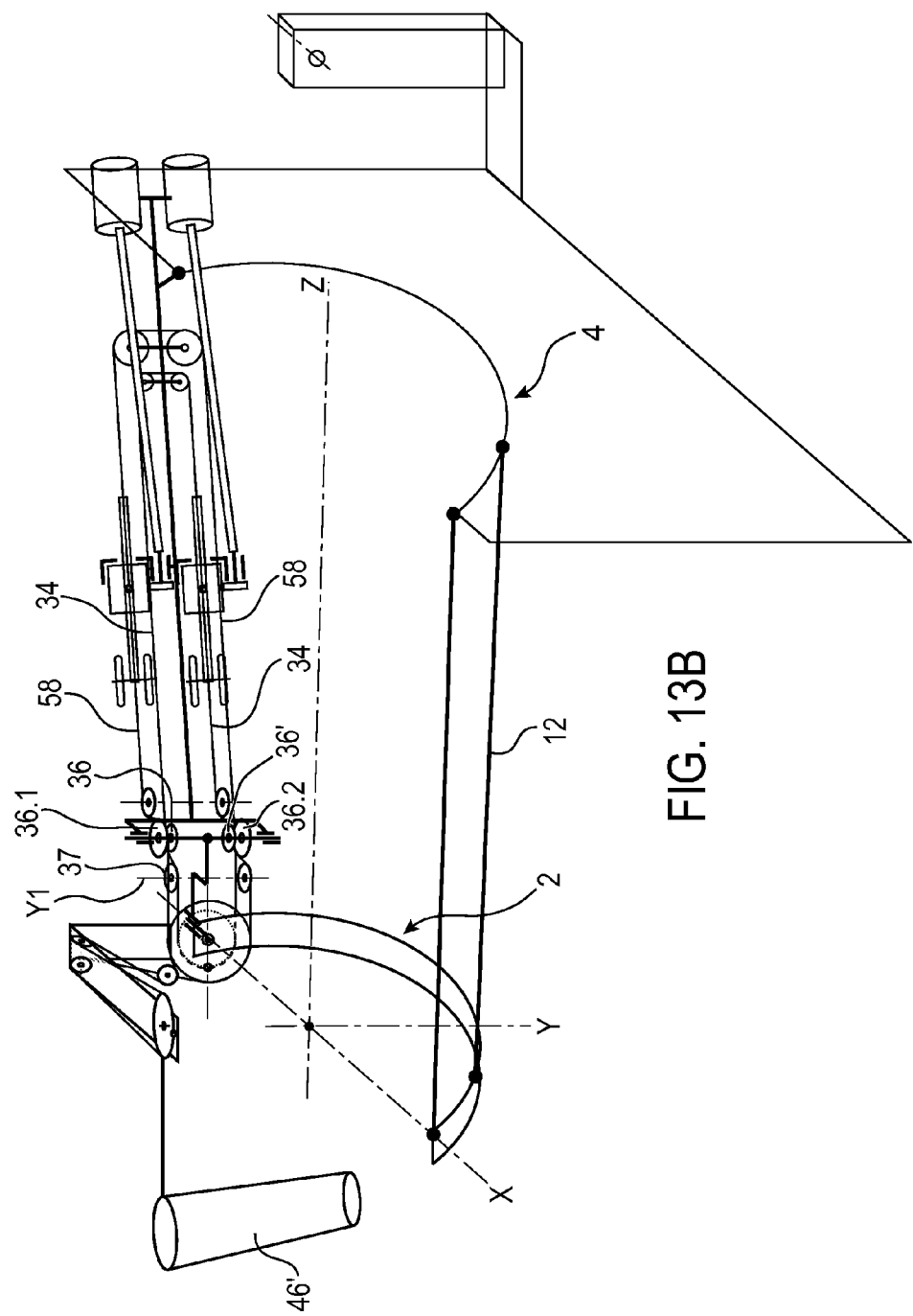
Figure 13C:
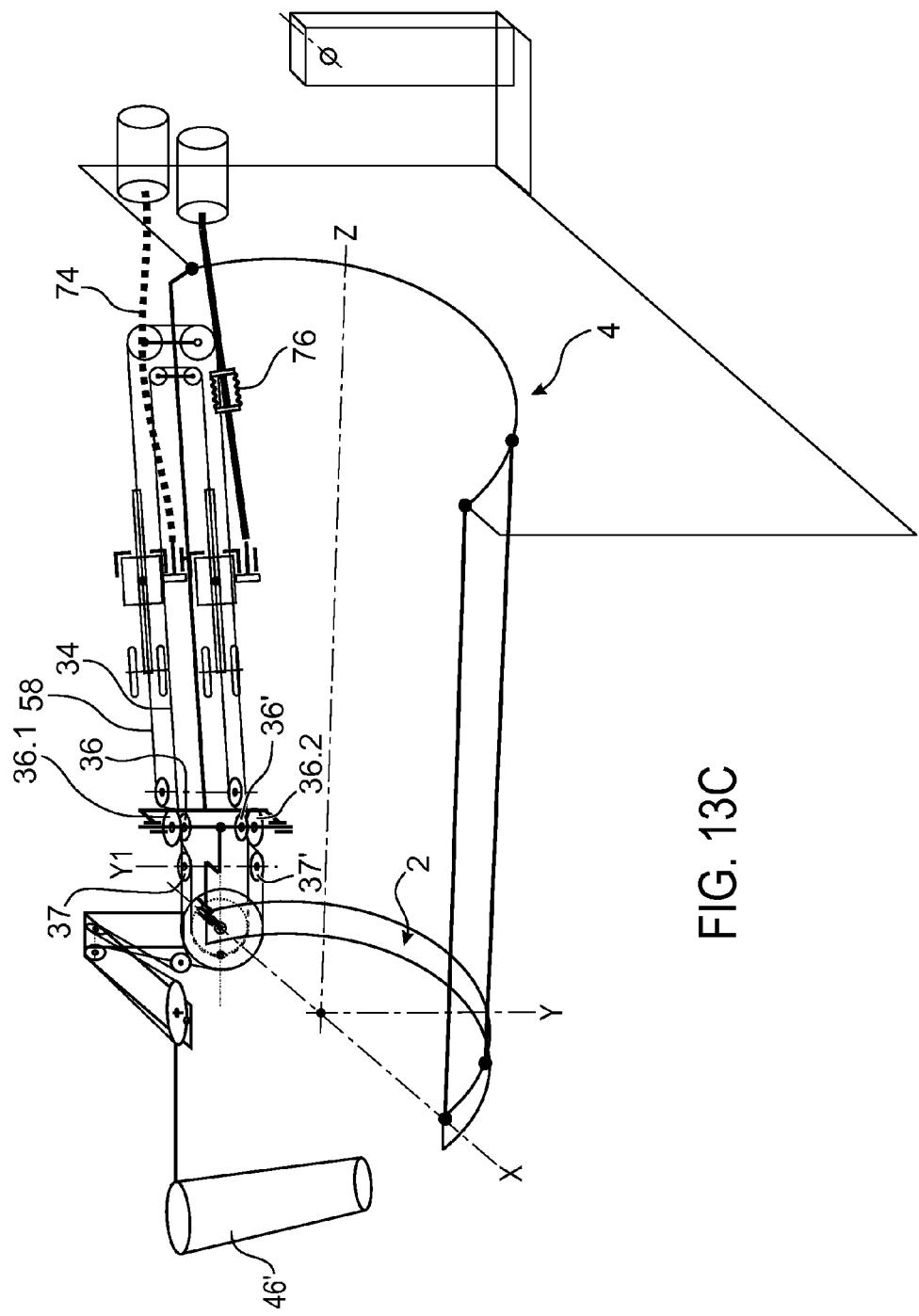
Figure 13A:
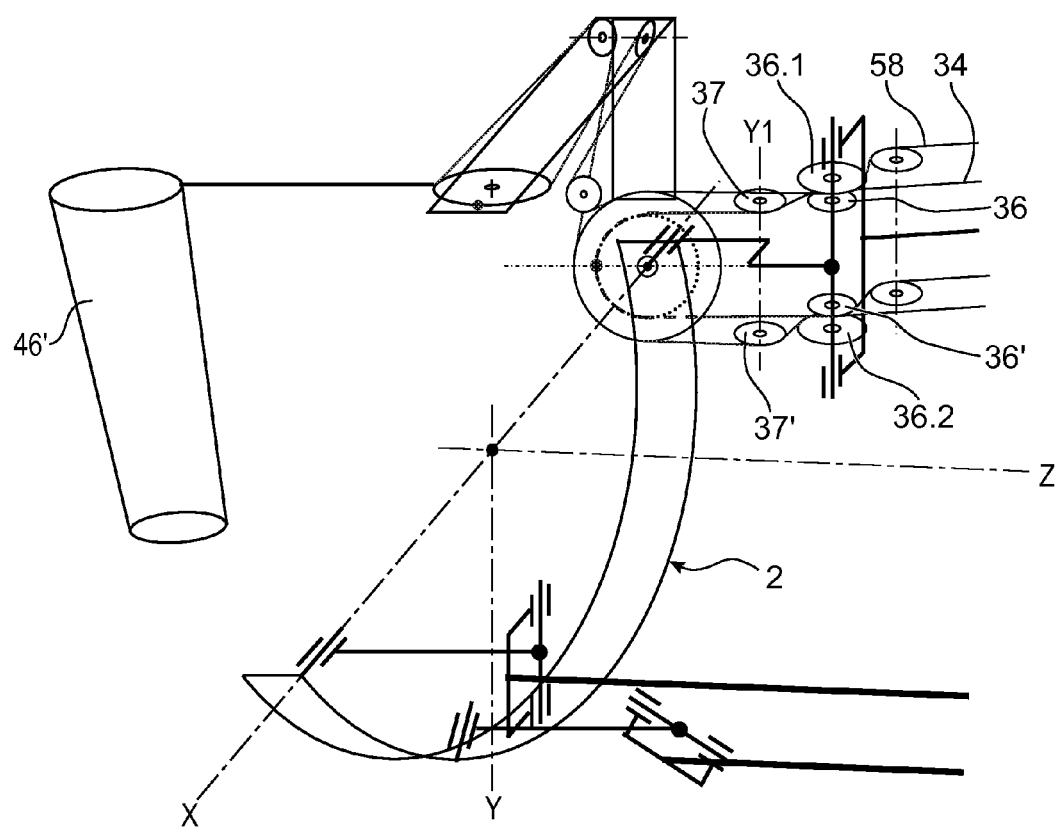

FIGS. 13A to 13C show embodiment variants of a mechanism according to the present invention. FIGS. 13A to 13C do not show the means used for guiding the moving stay 12 around the Z axis or the means of driving the moving means around the Z axis.

We will only describe the components which can be distinguished from the devices already described.

The devices in FIGS. 13A to 13C include a handle 46' which is connected to the mechanism by its upper end.

Furthermore, the paths of the cable strands 34, 58 for control around the X and Y1 axes respectively are modified As may be seen in FIGS. 13A to 13C and in detail in FIG. 13A', cable strand 34 passes forwards around pulleys 36, 37 and returns around pulleys 36', 37', with the return path occurring along pulleys 37', 36' in an manner which is diametrically opposite in relation to the path along pulleys 37, 36 respectively. Considering the axis which connects pulleys 36 and 36', the cable strand 34 passes along pulley 36 on one side of the axis going out and on the other side of the axis along pulley 36' on its return, and similarly considering the axis Y1 for pulleys 37, 37'.

The cable strand 58 travels around pulleys 36.1, 37 going out and returns around pulleys 37', 36.2 in the same manner by changing sides of the axis between the forwards path and the return.

In FIG. 13A furthermore it can be seen that each rod 12 is connected to the moving stay by a cardan joint combined with a pivot link.

In FIG. 13C, the cable actuators include, for one the flexible transmission shaft 74, and for the other a rigid transmission shaft 76 with a flexible coupling as in the variant in FIG. 9.

This forearm and wrist rotation mechanism offers the following advantages:
- it allows a forearm to be realised which is kinematically equivalent to the human forearm combined with comparable angular displacements. Furthermore, its longitudinal arrangement is open and discrete in terms of the human anatomy,
- its conical shape fits human limbs without any awkward protuberances.
- it provides realistic force feedback due to the intrinsic characteristics of the actuators,
- its influent mass (gravity and dynamic couple) is lower over the transverse axis of the forearm, i.e. the elbow axis, because the three motors are brought together close to the latter,
- it exhibits very low inertia over the longitudinal axis because of the very low speed of the two moving wrist motors. This advantage is further enhanced if the motors are fixed and if the transmission to the cylinders is achieved by flexible shafts or rigid shafts with flexible couplings as shown in FIG. 9.

Naturally, types of actuators other than cable actuators may be envisaged, for example of the gear drive type or belt and pinion type.

Figure 11:
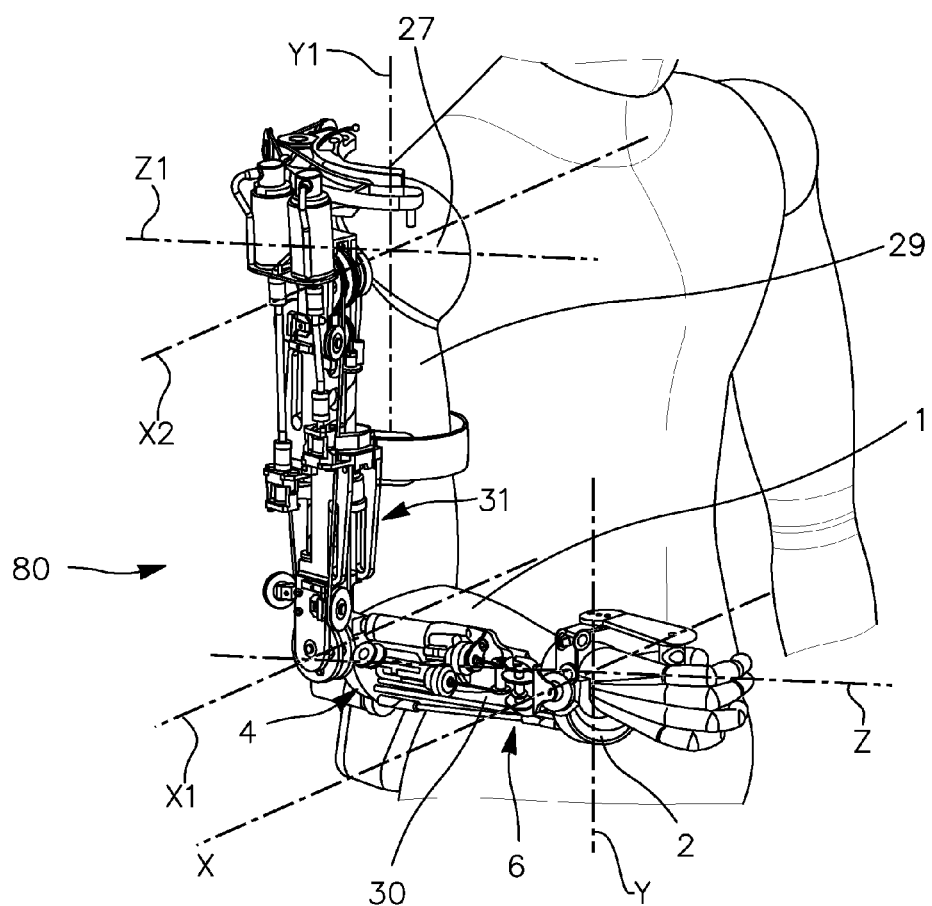
FIG. 11 is a perspective view of a seven-axis orthesis according to the invention.

The use of the previously described three-rotation forearm mechanism means that an orthesis with seven axes 80 as shown in FIG. 11 can be realised, with the two wrist axes X, Y being added to the five axes X2, Y1, Z1, X1, Z already described.

This orthesis is kinematically equivalent to the human arm and therefore of universal usage, whilst retaining the favourable characteristics of that with five axes described previously i.e. a form which fits that of the individual without enclosing them, force feedback and low inertia.

The five- or seven-axis ortheses may be used in the field of assistance for the handicapped, by providing assistance or temporary replacement and in the field of fixed or ambulatory station rehabilitation.

They may also be used in the field of virtual reality for manipulating virtual objects and to allow free movement in an immersion room since it may be worn by the operator.

In the field of remote operation these ortheses offer excellent ergonomics and natural manipulation. In addition the balanced weight of the operator's arms mean that fatigue is reduced, the work even being capable of being carried out by motor-handicapped individuals. They also allow natural control over a redundant arm (7 axes) and natural coordination of two slave arms They may also be used for assisting with occupational movements, and in the military fields for amplification of force.

In the case of use in remote operation, a control lever for a gripper could be advantageously added. This could be equipped with a position sensor or, if appropriate, a specific force feedback actuator to reproduce the sensation of gripping.

Naturally, depending on the applications, the proposed mechanism may be supplemented by other axes, for example for a grip command handle for a grab in remote operation, by a simplified "hand" etc.

The invention claimed is:

1. Rotation mechanism for a forearm which includes a moving stay (2) designed to support a wrist, where the moving stay (2) includes at least one guide track in the form of an arc of a circle, a fixed stay (4) designed to support the rear end of a forearm, rods (12) that are rigid lengthwise which link the moving stay (2) and the fixed stay (4) and which allow the moving stay (2) to rotate relative to the fixed stay (4) around a longitudinal axis (Z) by articulated links which can rotate (14, 32), and a strut (6, 6') rigidly linked at one of its ends to the fixed stay (4), and linked at its other end to a roller-bearing, whose rollers (8) are in rolling contact with at least one guide track of the moving stay (2), where the rollers (8) cause the moving stay (2) to pivot around a longitudinal axis (Z), where the direction of said longitudinal axis (Z) passes through a centre of the arc of the circle of the guide track and through a centre of a circle defined by ends of rods linked to the fixed stay.

2. Rotation mechanism according to claim 1, in which at least one of the articulated links on each rod is a ball-joint link, a ball-joint combined with a pivot link, or a link made up of three rotations around three axes, and the remaining articulated links of each rod is a link which allows at least two rotations around two orthogonal axes whether the at least two rotations are concurrent or not.

3. Rotation mechanism according to claim 1, in which there are at least three articulated rods (12).

4. Rotation mechanism according to claim 1 in which the strut (6) is made using a mesh of light bars, whose rigidity is such that a run-out of the moving stay does not result in unwanted angular movements which are perceptible to the user.

5. Rotation mechanism according to claim 1 in which the fixed stay (4) is a segment of an arc of a circle whose radius is greater than that of the moving stay (2), so that it defines a mechanism with a truncated cone form whose generatrices are the rods (12).

6. Rotation mechanism according to claim 1, which further includes an actuation system which is operationally connected to and drives the rotation of the moving stay (2) around the said longitudinal axis (Z).

7. Rotation mechanism according to claim 1, in which at least one of the articulated links on each rod is a cardan join combined with a pivot link which is concurrent with the centre of the cardan joint, and the remaining articulated links of each rod is a link which allows at least two rotations around two orthogonal axes whether concurrent or not.

8. Rotation mechanism according to claim 2, in which first articulated links which are articulated in rotation and which connect the rods (12) to a first stay being one of the moving stay (2) or the fixed stay (4) are ball-joint links, a ball-joint link combined with a pivot link, or a made up of three rotations around three axes, and where second articulated links that are not the first articulated links connecting the rods (12) to a second stay being one of the fixed stay (4) or the moving stay (2) that is not the first stay are links which allow at least two rotations around two orthogonal axes whether concurrent or not.

9. Rotation mechanism according to claim 2, in which first articulated links which are articulated in rotation and which connect the rods (12) to a first stay being one of the moving stay (2) or the fixed stay (4) are a cardan joint combined with a pivot link which is concurrent with the centre of the cardan joint, and where second articulated links that are not the first articulated links connecting the rods (12) to a second stay being one of the fixed stay (4) or the moving stay (2) that is not the first stay are links which allow at least two rotations around two orthogonal axes whether concurrent or not.

10. Rotation mechanism according to claim 6 in which the actuation system includes a pinion which engages with a toothed segment which is firmly fixed to the moving stay (2), where the pinion is driven by an electric motor.

11. Rotation mechanism according to claim 6 in which the actuation system includes a belt which engages with a pinion and with a toothed segment which is firmly fixed to the moving stay (2), where the pinion is driven by an electric motor.

12. Rotation mechanism according to claim 6 in which the actuation system includes a reversible cable actuator driven by an electric motor.

13. Rotation mechanism according to claim 12, in which the motor is mounted adjacent to the fixed stay (4).

14. Rotation mechanism according to claim 12, in which the strut (6') includes two lateral rods and one central rod, the longitudinal ends of the two lateral rods and the one central rod being connected to the fixed stay (4) and the other ends of the two lateral rods and the one central rod being connected to a junction plate (81) which bears the roller-bearing, where the central rod is a splined shaft (82), where the cable actuator includes a motor (18) fixed to the fixed stay (4), a screw (88) which is approximately parallel to the splined shaft (82), a nut (85) is made to rotate by the electric motor (18), a bush (104) designed to slide on the splined shaft (82), where the bush is firmly fixed to the screw (88), so that the bush is prevented from turning.

15. Rotation mechanism according to claim 14, in which the firm attachment between the bush (104) and the screw (88) is elastic.

16. Rotation mechanism according to claim 14, in which the motor (18) drives the nut (85) by means of a toothed belt (86) passing around the splined shaft (82).

17. Rotation mechanism according to claim 14, in which the roller-bearing overhangs over the junction plate (81), laterally offset in relation to the longitudinal axis (Z).

18. Rotation mechanism according to claim 14 in which the moving stay (2) includes grooves to guide the ends of the cables, the grooves being adapted to compensate for the intrinsic longitudinal translation movement of the moving stay (2).

19. Rotation mechanism according to claim 14, in which the moving stay (2) includes grooves for guiding the ends of the cable, with the moving stay (2) being articulated around a transverse axis (X) in order to compensate for the intrinsic longitudinal translation movement of the moving stay (2).

20. Rotation mechanism according to claim 19, which further includes two additional transverse rotation articulations designed to reproduce the two articulations of the wrist, said articulations being located at the moving stay (2).

21. Rotation mechanism according to claim 20, which includes a plate (30) linked to the moving stay (2) by two pivot links with orthogonal axes and linked to the fixed stay (4) by a ball-joint link, a ball-joint combined with a pivot link or a link made up of three rotations around three axes, where said plate (30) supports a first actuator (40) capable of causing a first segment to rotate around a transverse axis of the wrist (X) and a second actuator capable of causing a second segment to rotate around a transverse axis (y) of the wrist, where the second segment is carried on the first segment.

22. Rotation mechanism according to claim 20, which includes a plate (30) linked to the moving stay (2) by two pivot links with orthogonal axes and linked to the fixed stay (4) by a cardan joint combined with a pivot link concurrent with the centre of the cardan joint, where said plate (30) supports a first actuator (40) capable of causing a first segment to rotate around a transverse axis of the wrist (X) and a second actuator capable of causing a second segment to rotate around a transverse axis (Y) of the wrist, where the second segment is carried on the first segment.

23. Rotation mechanism according to claim 21 in which the first (40) and second actuators are reversible cable cylinders each including a cable (34, 58) formed into a loop and which passes along the plate up to guide pulleys which are firmly fixed in rotation to the first and second segments respectively.

24. Rotation mechanism according to claim 21, which include guide pulleys with the same axes as the axis of one of the pivot links.

25. Rotation mechanism according to claim 23 in which the cable cylinders (40) are actuated by motors arranged on the plate adjacent to the fixed stay.

26. Rotation mechanism according to claim 23 in which the cable cylinders are actuated by motors fixed to the fixed stay (4), with each motor being linked to one of the cylinders by a flexible shaft or a shaft equipped with a coupling which is designed to tolerate extension.

27. Arm orthesis with five axes of rotation which includes the rotation mechanism according to claim 1, comprising the rotation mechanism being connected to a segment having a plurality of articulations designed to run alongside the arm.

28. Arm orthesis with seven axes of rotation which includes the rotation mechanism according to claim 1, comprising the rotation mechanism being connected to a segment having a plurality of articulations designed to run alongside the arm.

* * * * *

UNITED STATES PATENT AND TRADEMARK OFFICE
CERTIFICATE OF CORRECTION

PATENT NO. : 8,460,222 B2
APPLICATION NO. : 12/663568
DATED : June 11, 2013
INVENTOR(S) : Philippe Garrec Page 1 of 1

It is certified that error appears in the above-identified patent and that said Letters Patent is hereby corrected as shown below:

In the Claims

Column 17, line 21, please delete "12" and add -- 6 --

Signed and Sealed this
Eighth Day of October, 2013

Teresa Stanek Rea
*Deputy Director of the United States Patent and Trademark Office*